(12) United States Patent
You et al.

(10) Patent No.: US 8,861,791 B2
(45) Date of Patent: Oct. 14, 2014

(54) METHOD AND DEVICE FOR DETECTING ROAD REGION AS WELL AS METHOD AND DEVICE FOR DETECTING ROAD LINE

(71) Applicants: Ganmei You, Beijing (CN); Jichuan Zheng, Beijing (CN)

(72) Inventors: Ganmei You, Beijing (CN); Jichuan Zheng, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 10 days.

(21) Appl. No.: 13/705,718

(22) Filed: Dec. 5, 2012

(65) Prior Publication Data

US 2013/0163821 A1 Jun. 27, 2013

(30) Foreign Application Priority Data

Dec. 22, 2011 (CN) .......................... 2011 1 0434873

(51) Int. Cl.
*G06K 9/00* (2006.01)
*G06K 9/46* (2006.01)
*G06T 7/00* (2006.01)

(52) U.S. Cl.
CPC .......... *G06K 9/00208* (2013.01); *G06K 9/4609* (2013.01); *G06T 2207/10028* (2013.01); *G06T 7/0085* (2013.01); *G06T 2207/30256* (2013.01); *G06K 9/00798* (2013.01)
USPC ......................................... 382/104

(58) Field of Classification Search
None
See application file for complete search history.

(56) References Cited

U.S. PATENT DOCUMENTS

| 6,813,370 | B1 | 11/2004 | Arai | |
|---|---|---|---|---|
| 7,346,190 | B2 | 3/2008 | Taniguchi et al. | |
| 2006/0239509 | A1 | 10/2006 | Saito | |
| 2010/0329513 | A1* | 12/2010 | Klefenz | 382/104 |
| 2012/0128215 | A1* | 5/2012 | Satoh | 382/113 |
| 2012/0294482 | A1* | 11/2012 | Kasaoki | 382/103 |
| 2013/0038734 | A1* | 2/2013 | Furukawa | 348/148 |
| 2013/0272577 | A1* | 10/2013 | Sakamoto | 382/103 |

OTHER PUBLICATIONS

Soquet, N.; Aubert, D.; Hautiere, N., "Road Segmentation Supervised by an Extended V-Disparity Algorithm for Autonomous Navigation," Intelligent Vehicles Symposium, 2007 IEEE, vol., no., pp. 160,165, Jun. 13-15, 2007.*
Zhencheng Hu; Uchimura, K., "U-V-disparity: an efficient algorithm for stereovision based scene analysis," Intelligent Vehicles Symposium, 2005. Proceedings. IEEE, vol., no., pp. 48,54, Jun. 6-8, 2005.*
Jun Zhao; Katupitiya, J.; Ward, J., "Global Correlation Based Ground Plane Estimation Using V-Disparity Image," Robotics and Automation, 2007 IEEE International Conference on, vol., no., pp. 529,534, Apr. 10-14, 2007.*

(Continued)

*Primary Examiner* — Atiba O Fitzpatrick
*Assistant Examiner* — Thomas A James
(74) *Attorney, Agent, or Firm* — Harness, Dickey & Pierce, P.L.C.

(57) ABSTRACT

Disclosed are a road line detection method and a road line detection device. The road line detection method comprises a step of obtaining a first disparity map including one or more road regions and a corresponding V-disparity image; a step of sequentially detecting plural sloped line segments in the corresponding V-disparity image according to a big-to-small order of disparities and a big-to-small order of V-values, to serve as plural sequentially adjacent road surfaces; a step of obtaining a second disparity map of plural road line regions of interest corresponding to the plural sloped line segments; and a step of detecting one or more road lines in the second disparity map of the plural road line regions of interest.

11 Claims, 18 Drawing Sheets

(56) References Cited

OTHER PUBLICATIONS

Wedel, A.; Badino, H.; Rabe, C.; Loose, H.; Franke, U.; Cremers, D., "B-Spline Modeling of Road Surfaces With an Application to Free-Space Estimation," Intelligent Transportation Systems, IEEE Transactions on , vol. 10, No. 4, pp. 572,583, Dec. 2009.*
Le Thanh Sach; Atsuta, K.; Hamamoto, K.; Kondo, S., "A robust road profile estimation method for low texture stereo images," Image Processing (ICIP), 2009 16th IEEE International Conference on , vol., no., pp. 4273,4276, Nov. 7-10, 2009.*
Chung-Hee Lee; Young-Chul Lim; Soon Kwon; Jong-Hun Lee, "Obstacle localization with a binarized v-disparity map using local maximum frequency values in stereo vision," Signals, Circuits and Systems, 2008. SCS 2008. 2nd International Conference on , vol., no., pp. 1,4, Nov. 7-9, 2008.*
Pink, O., "Visual map matching and localization using a global feature map," Computer Vision and Pattern Recognition Workshops, 2008. CVPRW '08. IEEE Computer Society Conference on , vol., no., pp. 1,7, Jun. 23-28, 2008.*
Jun Zhao; Whitty, M.; Katupitiya, J., "Detection of non-flat ground surfaces using V-Disparity images," Intelligent Robots and Systems, 2009. IROS 2009. IEEE/RSJ International Conference on , vol., no., pp. 4584,4589, Oct. 10-15, 2009.*
Labayrade, R.; Aubert, D., "A single framework for vehicle roll, pitch, yaw estimation and obstacles detection by stereovision," Intelligent Vehicles Symposium, 2003. Proceedings. IEEE , vol., no., pp. 31,36, Jun. 9-11, 2003.*
Hautiere, N.; Labayrade, R.; Aubert, D., "Real-time disparity contrast combination for onboard estimation of the visibility distance," Intelligent Transportation Systems, IEEE Transactions on , vol. 7, No. 2, pp. 201,212, Jun. 2006.*
Suganuma, N.; Shimoyama, M.; Fujiwara, N., "Obstacle detection using Virtual Disparity Image for non-flat road," Intelligent Vehicles Symposium, 2008 IEEE , vol., no., pp. 596,601, Jun. 4-6, 2008.*
Min Zhang; Peizhi Liu; Xiaochuan Zhao; Xinxin Zhao; Yuan Zhang, "An obstacle detection algorithm based on U-V disparity map analysis," Information Theory and Information Security (ICITIS), 2010 IEEE International Conference on , vol., no., pp. 763,766, Dec. 17-19, 2010.*
Zhencheng Hu; Jia Wang; Uchimura, K., "Moving Obstacles Extraction with Stereo Global Motion Model," Pattern Recognition, 2006. ICPR 2006. 18th International Conference on , vol. 1, no., pp. 79,83, 0-0 0.*
Gao, Y.; Ai, X.; Wang, Y.; Rarity, J.; Dahnoun, N., "U-V-Disparity based Obstacle Detection with 3D Camera and steerable filter," Intelligent Vehicles Symposium (IV), 2011 IEEE , vol., no., pp. 957,962, Jun. 5-9, 2011.*
Einramhof, P.; Vincze, M., "Stereo-based real-time scene segmentation for a home robot," ELMAR, 2010 Proceedings , vol., no., pp. 455,458, Sep. 15-17, 2010.*
Ben Romdhane, N.; Hammami, M.; Ben-Abdallah, H., "A generic obstacle detection method for collision avoidance," Intelligent Vehicles Symposium (IV), 2011 IEEE , vol., no., pp. 491,496, Jun. 5-9, 2011.*
Chunhui Zheng; Green, R., "Vision-based autonomous navigation in indoor environments," Image and Vision Computing New Zealand (IVCNZ), 2010 25th International Conference of , vol., no., pp. 1,7, Nov. 8-9, 2010.*
CheeWay Teoh; ChingSeong Tan; Yong Chai Tan, "Ground plane detection for autonomous vehicle in rainforest terrain," Sustainable Utilization and Development in Engineering and Technology (STUDENT), 2010 IEEE Conference on , vol., no., pp. 7,12, Nov. 20-21, 2010.*
Ke Peiqi; Meng Cai; Li Jihao; LiuYing, "Homography-based ground area detection for indoor mobile robot using binocular cameras," Robotics, Automation and Mechatronics (RAM), 2011 IEEE Conference on , vol., no., pp. 30,34, Sep. 17-19, 2011.*
Sameera Kodagoda, "Stereo vision for obstacle detection in autonomous vehicle navigation" 2010.*
Zhao, Jun. Stereo Imaging and Obstacle Detection Methods for Vehicle Guidance. Diss. University of New South Wales, Australia, 2008.*
Broggi, A.; Caraffi, C.; Porta, P.P.; Zani, P., "The Single Frame Stereo Vision System for Reliable Obstacle Detection Used during the 2005 DARPA Grand Challenge on TerraMax," Intelligent Transportation Systems Conference, 2006. ITSC '06. IEEE , vol., no., pp. 745,752, Sep. 17-20, 2006.*
Broggi, A.; Caraffi, C.; Fedriga, R.I.; Grisleri, P., "Obstacle Detection with Stereo Vision for Off-Road Vehicle Navigation," Computer Vision and Pattern Recognition—Workshops, 2005. CVPR Workshops. IEEE Computer Society Conference on , vol., no., pp. 65,65, Jun. 25-25, 2005.*
Labayrade et al. (2002) "Real Time Obstacle Detection in Stereovision on Non Flat Road Geometry Through V-disparity Representaion" *IEEE Intelligent Vehicles Symposium 2002*, pp. 646-651, vol. 2.
Zhencheng, Hu et al.: "A Complete U-V-Disparity Study for Stereovision Based 3D Driving Environment Analysis", 3-D Digital Imaging and Modeling, 2005. 3DIM 2005. Fifth International Conference on Ottawa on, Canada Jun. 13-16, 2005, Piscataway, NJ, USA, IEEE, Jun. 13, 2005, pp. 204-211, XP010810998, DOI: 10.1109/3DIM.2005.6, ISBN: 978-0-7695-2327-9.
"Wikipedia: Binocular disparity", Aug. 4, 2014, XP055133003, Retrieved from the Internet: URL:http://en.wikipedia.org/wiki/Binocular_disparity [retrieved on Aug. 4, 2014].
European Search Report dated Aug. 14, 2014 in corresponding European Application No. 12196446.4.

* cited by examiner

LEFT IMAGE    RIGHT IMAGE

V-DISPARITY
IMAGE INCLUDING
SLOPED LINE
SEGMENT

HORIZONTAL
ROAD SURFACE
REGION

V-DISPARITY IMAGE — FINDING ROAD SURFACE REGION — FIRST DISPARITY MAP

ROAD SURFACE REGION

SECOND DISPARITY MAP INCLUDING ROAD LINE REGION OF INTEREST

LINES BEFORE FILTERING

FILTERING BASED ON SLOPES

ROAD LINES AFTER FILTERING

METHOD AND DEVICE FOR DETECTING ROAD REGION AS WELL AS METHOD AND DEVICE FOR DETECTING ROAD LINE

BACKGROUND OF THE INVENTION

1. Field of the Invention

The present invention relates to road detection and object detection, more particularly relates to a method and a device for detecting at least one road line as well as a method and a device for detecting at least one road region (hereinafter, sometimes called a "road surface region").

2. Description of the Related Art

A driving assistance system has been widely used up to now. A lane/road detection warning (LDW/RDW) system is a sub-system of the driving assistance system; by using the LDW/RDW system, for example, it is possible to avoid a car crash, and to more accurately determine a driving direction. The lane/road detection is very important to the LDW/RDW system; as long as the road information is known, it is possible to carry out a further process, for example, communicating a warning message. In general, the lane/road detection is conducted by detecting a road line that may be a road shoulder made of stone, a white line, a fence, etc.

Due to environments and geographical features, many road surfaces are not flat, i.e., they slope upward or downward. For example, Chongqing of China has many uneven mountain road surfaces; Hong Kong of China, Tokyo of Japan, etc., are the same.

In some conventional leading methods on the basis of stereoscopic vision, a road surface is assumed to be flat; as a result, regarding a sloped road surface, it is impossible to accurately detect at least one road line therein.

In US Patent Application Publication No. 2006/0239509 A1, a road line recognition apparatus is disclosed that includes an imaging section, an image processing section, and a detection section. The detection section includes a road line candidate point detection and conversion processing unit for detecting a pixel on a road surface as a road line candidate point on the basis of luminance and a distance with regard to an image on one side, and performing Hough conversion of the road line candidate point. However, since this apparatus adopts the luminance to seek the pixel on the road surface, it may be relatively sensitive to the luminance.

In a paper titled "Real Time Obstacle Detection in Stereovision on Non Flat Road Geometry Through V-disparity Representaion" (Raphael Labayrade, Didier Aubert, and Jean-Phisppe Tarel; IEEE Intelligent Vehicles Symposium 2002, pp 646-651, Vol. 2), a method of obtaining k lines having the highest Hough transform value from a V-disparity image is disclosed. Among the k lines, one having the highest cumulative total gray level is selected for road mapping; then a road surface region of interest may be acquired. After that, a road line may be sought from the road surface region of interest by employing the Hough transform.

In U.S. Pat. No. 7,346,190 B2, a traffic line recognition device is disclosed that includes a traffic line region candidate extraction section for extracting a traffic line candidate as a traffic line region candidate; a two dimension/three dimension transform section for transforming two dimensional image coordinates of a pixel contained in the traffic line region candidate into three dimensional coordinates; a histogram production section for accumulating and projecting the three dimensional coordinates onto a coordinate system in a direction crossing a road and producing a histogram in the direction crossing the road; and a traffic line judgment unit for determining a traffic line based on that histogram. However, this device may not be applied to a case where a road surface is uneven, for example, a case where there is a sloped road surface.

In addition, most of the conventional road detection methods are on the basis of a single color image or a polarization image. Therefore, as for an image in which road edges are dark, or a complex case, for example, a case in which there is a sloped road surface, the road detection may not have a good effect.

SUMMARY OF THE INVENTION

The present invention is proposed in the light of the above problems in the conventional techniques.

One aim of the present invention is to detect an uneven road surface.

Another aim of the present invention is to detect one or more road lines.

According to one aspect of the present invention, there is provided a road line detection method. The road line detection method may comprise a step of obtaining a first disparity map including one or more road regions and a corresponding V-disparity image; a step of sequentially detecting plural sloped line segments in the V-disparity image according to a big-to-small order of disparities and a big-to-small order of V-values, to serve as plural sequentially adjacent road surfaces; a step of obtaining a second disparity map of plural road line regions of interest corresponding to the plural sloped line segments; and a step of detecting one or more road lines in the second disparity map of the plural road line regions of interest.

The road line detection method may further comprise a step of, for each of the road lines detected in the second disparity map, obtaining points in a U-disparity image, corresponding to this road line, determining whether the points are located on a sloped line (i.e., a non-vertical and non-horizontal line), and discarding this road line if it is determined that the points are not located on the sloped line.

The road line detection method may further comprise a step of, before detecting the plural sloped line segments, removing at least one vertical line, whose length is greater than a predetermined length threshold value, in the V-disparity image.

According to another aspect of the present invention, there is provided a road region detection method. The road region detection method may comprise a step of obtaining a V-disparity image including one or more road regions; and a step of sequentially detecting plural sloped line segments in the V-disparity image according to a big-to-small order of disparities and a big-to-small order of V-values, to serve as plural sequentially adjacent road surfaces.

According to still another aspect of the present invention, there is provided a road line detection device. The road line detection device may comprise a first obtaining unit configured to obtain a first disparity map including one or more road regions and a corresponding V-disparity image; a first detection unit configured to sequentially detect plural sloped line segments in the V-disparity image according to a big-to-small order of disparities and a big-to-small order of V-values, to serve as plural sequentially adjacent road surfaces; a second obtaining unit configured to obtain a second disparity map of plural road line regions of interest corresponding to the plural sloped line segments; and a second detection unit configured to detect one or more road lines in the second disparity map of the plural road line regions of interest.

According to still another aspect of the present invention, there is provided a road region detection device. The road region detection device may comprise a V-disparity image obtaining unit configured to obtain a V-disparity image including one or more road regions; and a road surface detection unit configured to sequentially detect plural sloped line segments in the V-disparity image according to a big-to-small order of disparities and a big-to-small order of V-values, to serve as plural sequentially adjacent road surfaces.

Since the above road line detection method and device according to the aspects of the present invention utilize the V-disparity image to sequentially detect the plural sloped line segments therein according to the big-to-small order of disparities and the big-to-small order of V-values, and then to seek the plural sequentially adjacent road surfaces, it is possible to more rapidly and more accurately find (fit) an uneven road surface.

Furthermore, by employing a U-disparity image to verify the road line detection results, it is possible to further improve the detection accuracy.

In addition, in another aspect of the present invention, by detecting and removing at least one vertical line in the V-disparity image so as to clear at least one obstacle, it is also possible to further improve the detection speed and accuracy.

DETAILED DESCRIPTION OF THE PREFERRED EMBODIMENTS

Figure 1:
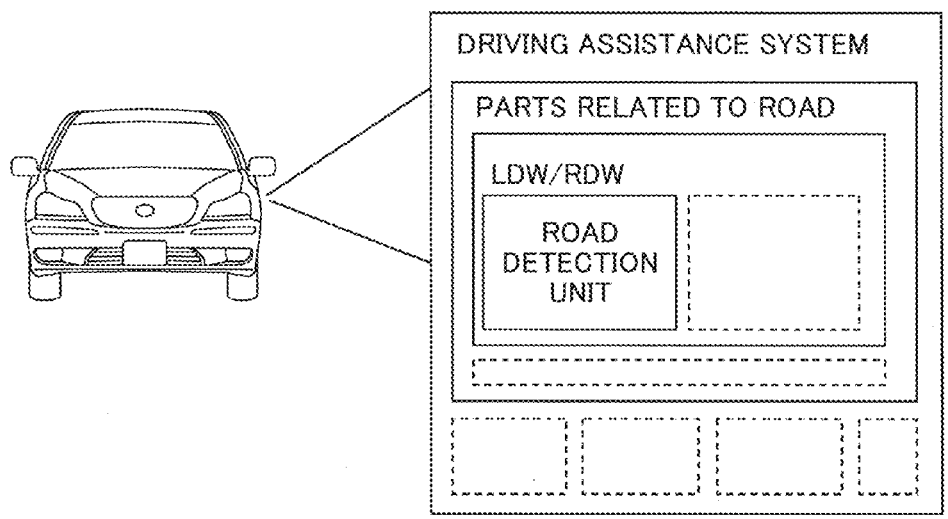
FIG. 1 illustrates a driving assistance system serving as an example of an application environment of the present invention.

In order to let those people skilled in the art better understand the present invention, hereinafter, the preferred embodiments of the present invention will be concretely described with reference to the drawings. However it should be noted that the same symbols, which are in the specification and the drawings, stand for constructional elements having basically the same function and structure, and repeated explanations for the constructional elements are omitted.

Here it should be noted that the detailed description of the preferred embodiments of the present invention will be carried out according to the following order.

1. Thought and Basic Concepts of the Invention
    2. First Embodiment (Road Line Detection Method)
    2.1 Process of Detecting Road Lines
    2.2 Obtaining Disparity Map, V-disparity Image, and U-disparity Image (Option)
    2.3 Detection of Sloped Line Segments in V-disparity Image for Fitting Uneven Road Surface
    2.4 Obtaining Disparity Map of Road Line Regions of Interest
    2.5 Detection of Road Lines in Road Line Regions of Interest
    3. Second Embodiment (Road Line Detection Method)
    4. Third Embodiment (Road Line Detection Method)
    5. Road Line Detection Device
    6. Road Region Detection Method
    7. Road Region Detection Device
    8. Hardware Arrangement of System
    9. Conclusions

1. THOUGHT AND BASIC CONCEPTS OF THE INVENTION

Before carrying out the detailed description of the preferred embodiments, the thought of the present invention is introduced so as to let those people skilled in the art better understand the present invention.

In order to detect a road line, first a road region should be determined. A V-disparity image has been utilized by those people skilled in the art to detect a flat road surface. In particular, the V-disparity image may be regarded as a lateral projection (i.e., a lateral view) of a disparity map. The flat road surface is expressed as a sloped line segment in the V-disparity image. As a result, the inventors of the present invention think that as for an uneven road surface, it may be regarded as one made of plural flat road surfaces which are expressed as plural sloped line segments having different slopes in the V-disparity image. In other words, using plural flat road surfaces to fit an uneven road surface is just like using plural straight line segments to fit a curve in mathematics. In this way, it is possible to obtain an uneven road region by detecting plural sloped line segments in the V-disparity image. Then, after the road region is determined, it is possible to detect a road line in the road surface region.

Next the basic concepts of the present invention are introduced for the purpose of understanding.

In actuality, a disparity refers to an angle between two lines which are formed from two ends of a base line to a same far object. In general, the disparity refers to a directional difference generated when observing a same object from two points (for example, the two eyes of a human being) having a certain distance. An angle between two lines respectively drawn from the two points to the same object is called a "disparity angle", and the distance between the two points is called a "base line length". That is to say, as long as the disparity angle and the base line length are known, it is possible to calculate a distance between a target (e.g., the same object) and an observer (e.g., the human being).

A disparity map is an image whose size is the same with that of another image regarded as a criterion and whose element values are disparity values. The disparity map includes distance information of a scene. The disparity map may be acquired by conducting calculation with regard to left and right images captured by a twin-lens camera, or may be obtained by performing calculation with regard to a depth map in stereoscopic vision.

The coordinates of a point in a common two dimensional disparity map may be expressed by (u, v) in which u stands for an abscissa, and v stands for an ordinate. The pixel value of the point (u, v) may be expressed by d(u, v), and represents the disparity of the point (u, v).

In order to be easily understood, a V-disparity image may be regarded as a lateral view of a disparity map, and a U-disparity image may be regarded as a top view of the disparity map. The V-disparity image or U-disparity image may be obtained by carrying out calculation with regard to the disparity map, respectively. The gray level of a point (d, v) in a V-disparity image refers to the number of points on a line, whose ordinate is v, in a corresponding disparity map, and the disparity value of each of the points is equal to d. On the other hand, the gray value of a point (u, d) in a U-disparity image refers to the number of points on a column, whose abscissa is u, in a corresponding disparity map, and the disparity value of each of the points is equal to d.

2. FIRST EMBODIMENT

Road Line Detection Method

<2.1 Process of Detecting Road Lines>

FIG. 1 illustrates a driving assistance system serving as an example of an application environment of the present invention.

Here it should be noted that an achievement based on software or hardware, of the present invention may be considered as a road detection unit in the driving assistance system shown in FIG. 1.

Figure 2:
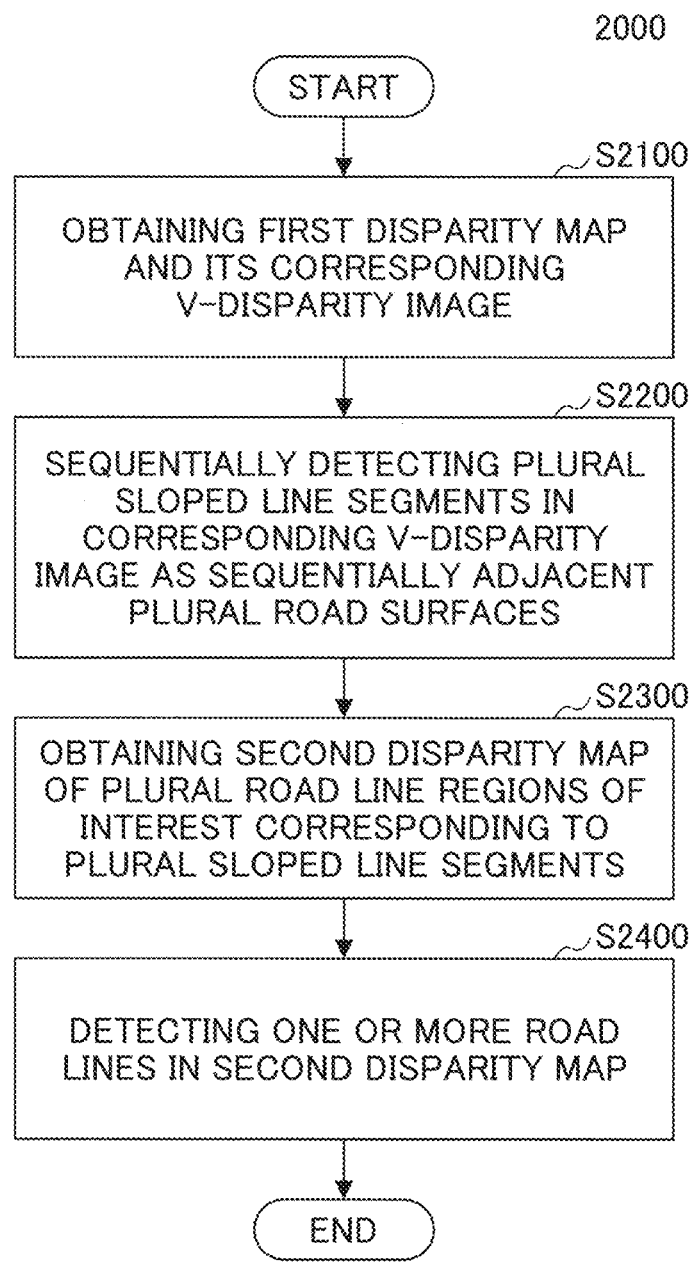
FIG. 2 is a flowchart of a road line detection method according to a first embodiment of the present invention.

FIG. 2 is a flowchart of a road line detection method according to this embodiment.

In STEP S2100 of the road line detection process 2000 shown in FIG. 2, a disparity map (also called a "first disparity map") including one or more road regions and a corresponding V-disparity image are obtained. As described above, the first disparity map including the road regions may be obtained by carrying out calculation with regard to images captured by a twin-lens camera, a multi-lens camera, or a stereoscopic camera, and the V-disparity image may be obtained by carrying out conversion with regard to the first disparity map. Alternatively, the first disparity map may be obtained on the basis of a depth map in stereoscopic vision, and the V-disparity image may be obtained by carrying out conversion with regard to the first disparity map. Here it should be noted that how to obtain the first disparity map and the V-disparity image will be concretely described below by referring to FIGS. 3 to 7.

In STEP S2200, plural sloped line segments are detected sequentially in the V-disparity image according to a big-to-small order of disparities and a big-to-small order of V-values (i.e., values of a V-axis), to serve as plural sequentially adjacent road surfaces. Here it should be noted that how to sequentially detect the plural sloped line segments in the V-disparity image will be concretely described below by referring to FIG. 8.

In this embodiment, the plural sloped line segments are not detected arbitrarily, but are detected sequentially according the big-to-small order of disparities and the big-to-small order of V-values. The reason is because there is an inverse relationship between a disparity and a distance as those people skilled in the art have known; here the distance refers to one from a camera. In a case in which a twin-lens camera is installed in a vehicle, a road surface in the first disparity map, nearest the vehicle may be considered parallel to the vehicle's horizontal plane; this road surface is expected to be first detected, and then plural road surfaces are sequentially detected according to a near-to-far order (i.e., the big-to-small order of disparities). In actuality, what a V-value represents in a V-disparity image is a height, i.e., is different from that in a common coordinate system. Furthermore, in a V-disparity image, the V-axis extends downward from the coordinate origin; therefore, the above mentioned big-to-small order of V-values indicates that the detection is carried out from low to high. The reason is because generally speaking, a road face is lowest.

This kind of detection order may ensure that a road surface may be detected rapidly and accurately, so as to decrease the possibility that roofs of tall buildings, etc., may be detected as road surfaces. In other words, if it is assumed that a sloped line segment is randomly selected as a start road surface for carrying out the detection, then maybe the detected object corresponding to this sloped line segment is not a road surface, but is, for example, a tree or a building. The reason is because the tree or the building may be expressed by a sloped line segment too.

In STEP S2300, a disparity map (also called a "second disparity map") of plural road line regions of interest corresponding to the plural sloped line segments is obtained. After the plural sloped line segments representing the plural road surfaces are acquired in the V-disparity image, it is possible to regenerate plural road regions in the second disparity map on the basis of the plural sloped line segments; the regenerated plural road regions are the plural road line regions of interest. After that, the second disparity map of the plural road line regions of interest may be obtained. Here it should be noted that how to obtain the second disparity map will be concretely described below by referring to FIG. 12.

In STEP S2400, one or more road lines in each of the plural road line regions of interest in the second disparity map are detected. Generally, in the second disparity map, a road line is expressed as a sloped line segment; as a result, it is possible to detect the road line by searching for the sloped line segment in the corresponding road line regions of interest.

<2.2 Obtaining Disparity Map, V-Disparity Image, and U-disparity Image (Option)>

In what follows, by referring to FIGS. 3 to 7, how to obtain a disparity map (i.e., a first disparity map) including one or more road regions, a corresponding V-disparity image, and a corresponding U-disparity image (an option), according to an embodiment of the present invention is concretely described.

Here a case is illustrated in which the disparity map, the V-disparity image, and the U-disparity image are obtained by utilizing a twin-lens camera. However, it should be noted that the present invention is not limited to this. In other words, as described above, for example, a multi-lens camera or a stereoscopic camera may be utilized for obtaining the disparity map, the V-disparity image, and the U-disparity image. Alternatively, a depth map in stereoscopic vision may also be utilized for acquiring the disparity map, the V-disparity image, and the U-disparity image.

Figure 3:
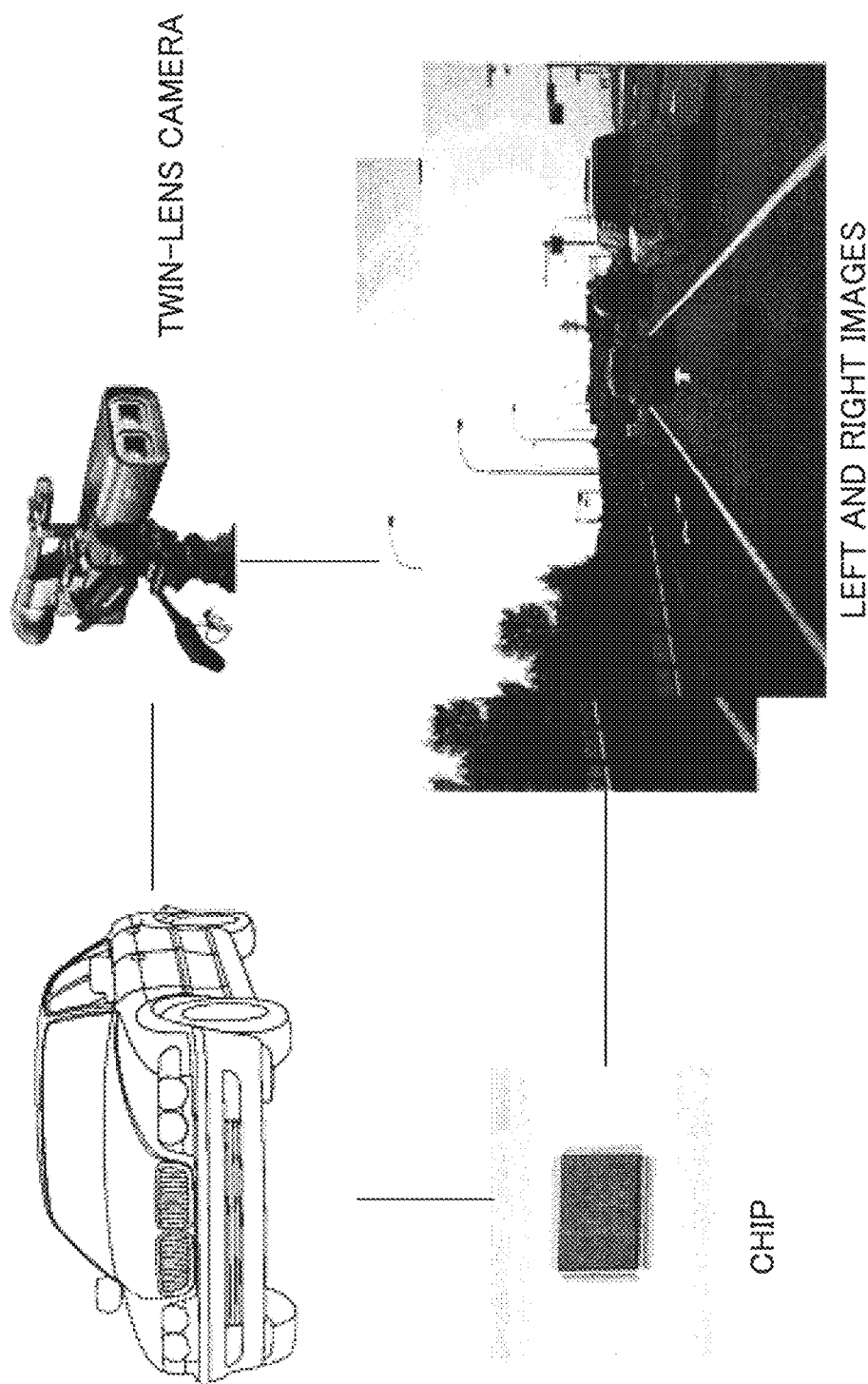
FIG. 3 illustrates an example of a system operation in a case in which a twin-lens camera is installed in a vehicle.

FIG. 3 illustrates an example of a system operation in a case in which a twin-lens camera is installed in a vehicle.

As shown in FIG. 3, the twin-lens camera is disposed in the vehicle for capturing left and right images. The captured left and right images are stored in a memory of the system. A chip (i.e., a processor) is configured to process the left and right images so as to obtain a disparity map, a V-disparity image, and a U-disparity image (an option), and to carry out the follow-on road region detection and road line detection.

Figure 4:
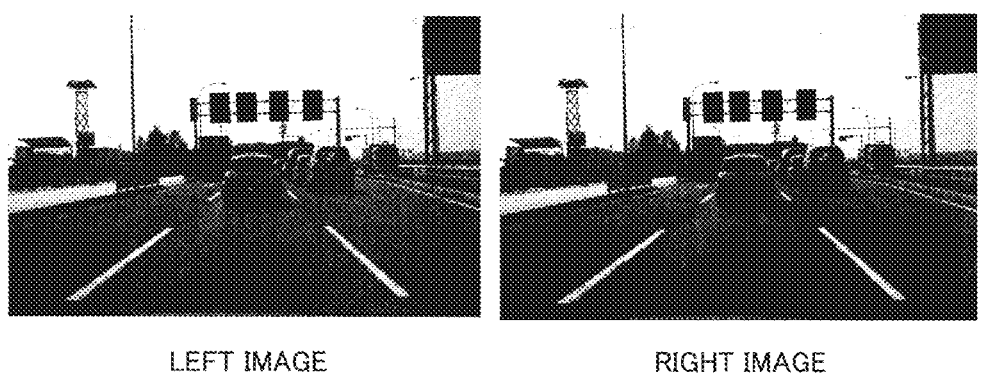
FIG. 4 illustrates examples of left and right images captured by the twin-lens camera shown in FIG. 3.

FIG. 4 illustrates examples of left and right images captured by the twin-lens camera shown in FIG. 3.

Here it should be noted that it is possible to employ an algorithm titled "Sum of Absolute Differences (SAD)" to calculate the disparity map on the basis of the left and right images. As for the SAD algorithm, it may be reached by accessing "http://www.videredesign.com/templates/stoc.html" (Videre Design, "Stereo on a Chip (STOC)").

Figure 5:
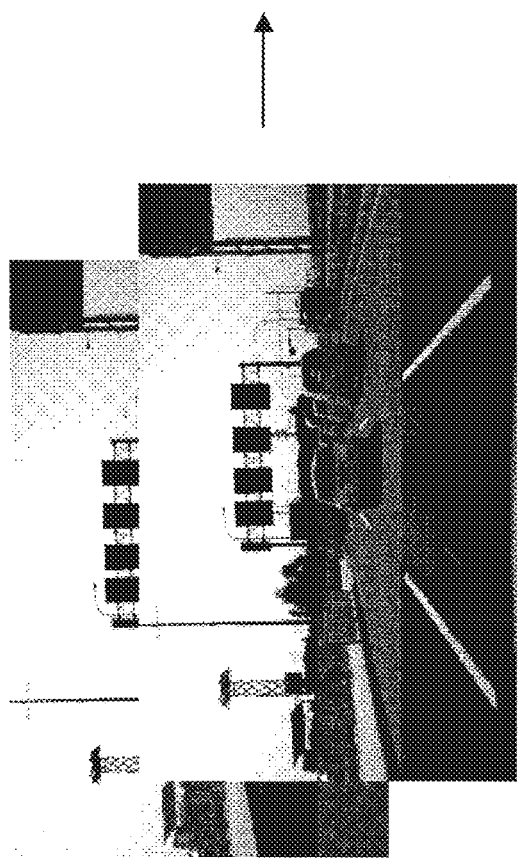
FIG. 5 illustrates left and right images as well as a corresponding disparity map obtained by carrying out calculation with regard to the left and right images.

FIG. 5 illustrates the left and right images as well as the corresponding disparity map obtained by carrying out calculation with regard to the left and right images.

After the disparity map is obtained, it is possible to acquire the corresponding V-disparity image. Regarding a point (d, v) in the V-disparity image, its gray level is the number of points on a line, whose ordinate is v, in the disparity map, and the disparity of each of the points is equal to d.

Figure 6:
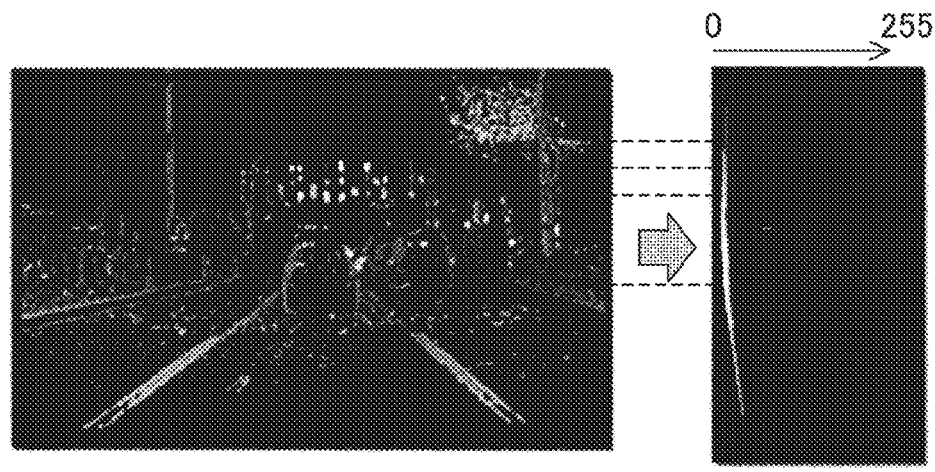
FIG. 6 illustrates an example of obtaining a V-disparity image from a disparity map.

FIG. 6 illustrates an example of obtaining a V-disparity image from a disparity map.

In FIG. 6, on the left is a disparity map, and on the right is an obtained V-disparity image. In the V-disparity image, the horizontal axis represents a disparity value d, and the vertical axis represents a height value v.

Similarly, after the disparity map is obtained, the U-disparity image may be obtained on the basis of the disparity map. As for a point (u, d) in the U-disparity image, its gray level is the number of points on a column, whose abscissa is u, in the disparity map, and the disparity of each of the points is equal to d.

Figure 7:
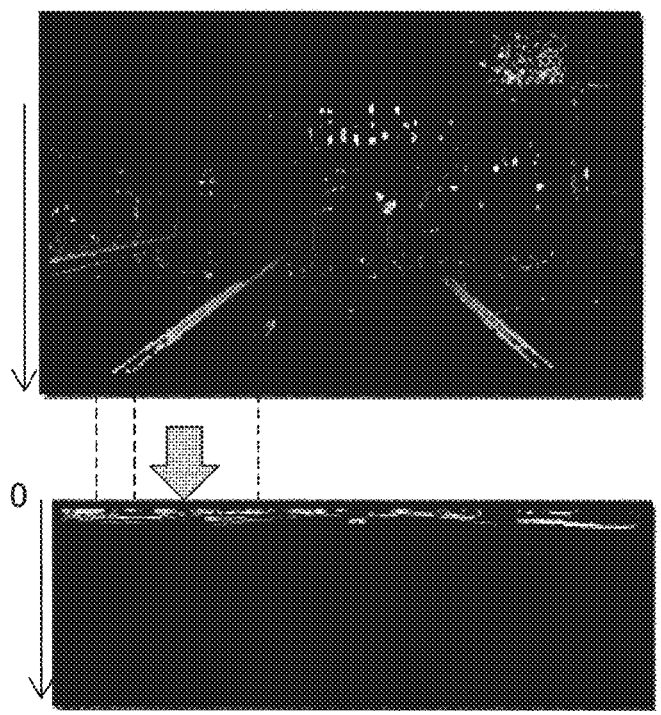
FIG. 7 illustrates an example of obtaining a U-disparity image from a disparity map.

FIG. 7 illustrates an example of obtaining a U-disparity image from a disparity map.

In FIG. 7, on the top is a disparity map, and on the bottom is an obtained U-disparity image. In the U-disparity image, the horizontal axis represents a width value u, and the vertical axis represents a disparity value d.

<2.3 Detection of Sloped Line Segments in V-disparity Image for Fitting Uneven Road Surface>

Next, how to detect plural sloped line segments in a V-disparity image for fitting an uneven road surface is described in detail.

Figure 8:
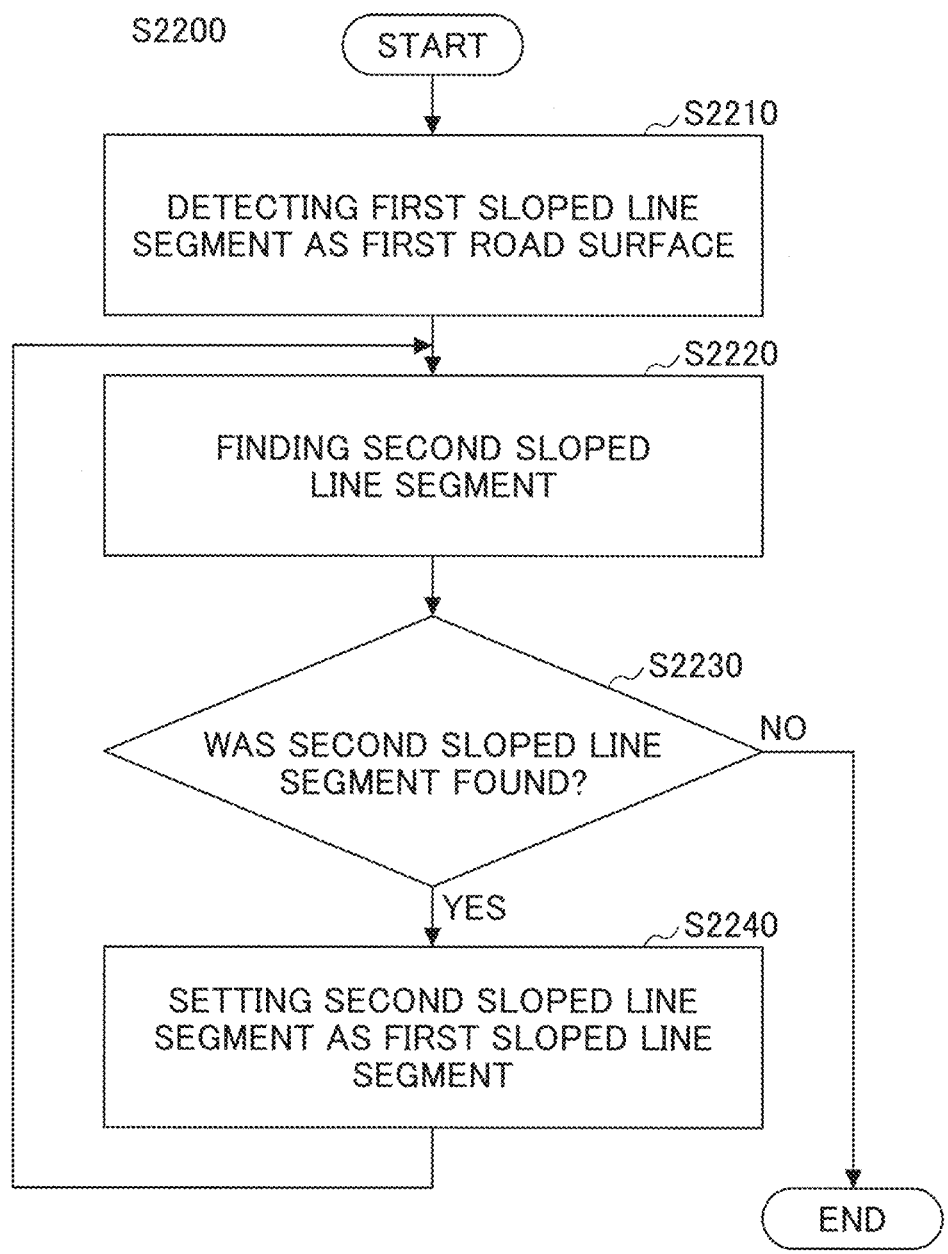
FIG. 8 is a flowchart of detecting plural sloped line segments in a V-disparity image for fitting an uneven road surface, according to an embodiment of the present invention.

FIG. 8 is a flowchart of detecting plural sloped line segments in a V-disparity image for fitting an uneven road surface, according to an embodiment of the present invention.

As shown in FIG. 8, in STEP S2210, a first sloped line segment is detected from a start point whose disparity is maximum and whose V-value is maximum, to serve as a first road surface. In particular, it is possible to utilize the Hough transform to seek plural line segments in the V-disparity image, and to let the first sloped one of the plural line segments sought from the start point be the first road surface.

Alternatively, it is also possible to seek continuous points from the start point, then to generate plural sloped line segments on the basis of the sought continuous points, and then to let the first one of the generated plural sloped line segments be the first road surface.

In addition, alternatively, it is also possible to obtain plural sloped line segments by carrying out a filtering process with regard to the plural line segments sought by utilizing the Hough transform, then to seek one of the obtained plural sloped line segments, on which the number of pass points is maximum or whose disparity is maximum or whose length is maximum, and then let the sought one be the first sloped line.

As described above, since the first sloped line segment is sought from the start point whose disparity is maximum and whose V-value is maximum, it is possible to obtain a road surface relatively horizontal to a vehicle more rapidly and accurately; sometimes this road surface is called a "relatively horizontal road surface".

Furthermore, if parameters of a twin-lens camera for capturing a scene in front of a vehicle are given, then the first sloped line segment may be expressed by utilizing the following equation (1).

$$\frac{h}{b}\Delta = f\sin\theta + V\cos\theta \qquad (1)$$

Here h refers to the distance (i.e., the height) between the twin-lens camera for capturing left and right images and a road surface; b refers to the distance between the centers of the two lenses in the twin-lens camera; $\theta$ refers to the angle between an image surface and the road surface; f refers to the focal length of the twin-lens camera; $\Delta$ refers to a disparity of a point on a sloped line segment; and V refers to a V-value of the corresponding point on the sloped line segment.

Figure 9:
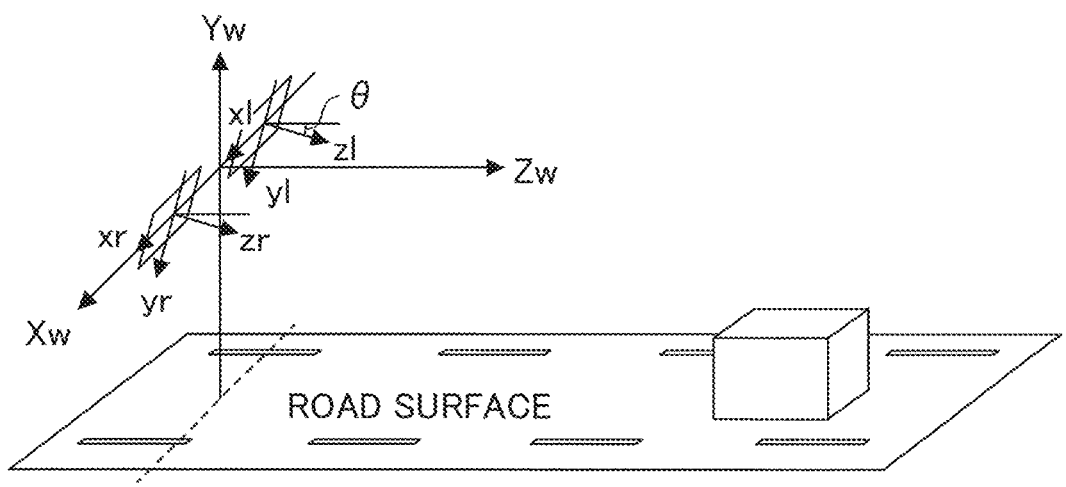
FIG. 9 illustrates meanings of various parameters for capturing a scene in front of a vehicle.

FIG. 9 illustrates meanings of various parameters for capturing a scene in front of a vehicle.

In FIG. 9, $(X_W, Y_W, X_W)$ stands for a world coordinate system; (xl, yl, zl) and (xr, yr, zr) stand for image surface coordinate systems of left and right images, respectively; and $\theta$ stands for the angle between an image surface and a road surface. As those people skilled in the art have known, it is possible to carry out conversion from the world coordinate system $(X_W, Y_W, X_W)$ to a stereoscopic camera coordinate system (U, V) with regard to images, so as to calculate disparities. Here it should be noted that as for how to carry out the conversion, since it is well-known to those people skilled in the art (for details, see "A Complete U-V-Disparity Study for Stereovision Based 3D Driving Environment Analysis"; Zhencheng Hu, F. Lamosa, and K. Uchimura; Fifth International Conference on 3-D Digital Imaging and Modeling, 2005, pp. 240-211), its illustration is omitted.

Figure 10:
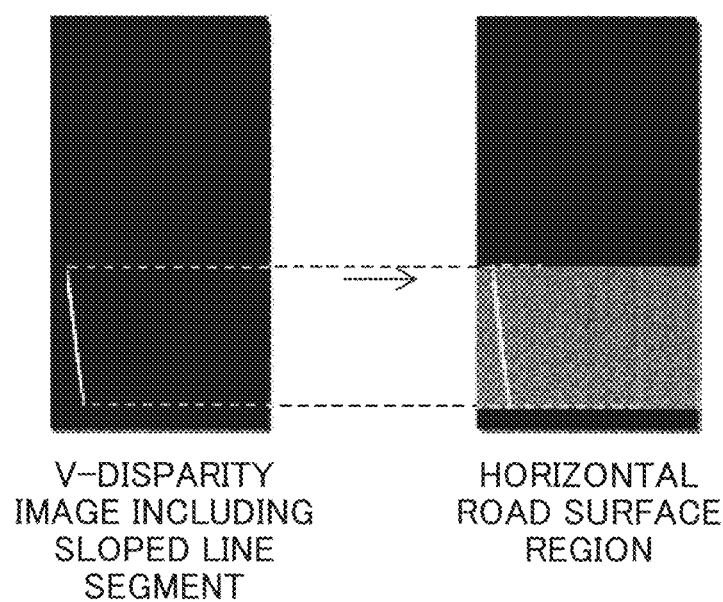
FIG. 10 illustrates an example of a first sloped line and its corresponding flat road surface region.

FIG. 10 illustrates an example of the first sloped line and its corresponding flat road surface region.

In STEP S2220, a second sloped line segment is sought in an adjacent region which is located above the horizontal region corresponding to the first sloped line and whose disparity is less, to serve as a second road surface.

For instance, it is possible to seek a predetermined number of reliable points, and then to obtain the second sloped line segment by carrying out linear fitting with regard to the reliable points. Here it should be noted that the reliable points refer to those more probably on the second road surface. In particular, a point, whose gray level is greater than a predetermined threshold value and which is not located on a vertical line and whose disparity is less than that of a point on the first sloped segment, may be defined as a reliable one.

The reason why the gray level of a reliable point should be greater than a predetermined threshold value is because there is noise. That is to say, this predetermined threshold value is for filtering out the noise. As described above, the gray level of a point (d, v) in a V-disparity image represents the number of points on the line v in the corresponding disparity map, and the disparity of each of the points is d. As a result, any two of the disparities of respective points belonging to a road surface, on a line in a disparity map should approach each other. In other words, the more the number of points having a same disparity, on a same line in a disparity map is, the bigger the gray value of the corresponding point in the corresponding V-disparity image is. On the other hand, if points on a same line in a disparity map are noise, then in general, the points are located randomly, and the number of the points is less; as a result, the gray level of the corresponding point in the corresponding V-disparity image is smaller.

The reason why a reliable point should not be on a vertical line is because in a V-disparity image, a vertical line does not stand for a road surface, but more probably stands for, for example, a tree or a building.

In addition, the reason why the disparity of a reliable point should be less than that of a point on the first sloped line segment is because, as described above, a reliable point should be sought according to the big-to-small order of disparities, i.e., a road surface should be sought according to the small-to-big (near-to-far) order of distances from a vehicle.

Here it should be noted that since the second sloped line segment is obtained by carrying out linear fitting with regard to the predetermined number of reliable points, the predetermined number should be at least two.

However, the present invention is not limited to the above approach of obtaining the second sloped line segment, i.e., obtaining the second sloped line segment by conducting linear fitting with regard to plural reliable points. In other words, any proper conventional approach (for example, the Hough transform) able to seek the second sloped line segment in the adjacent region may be adopted in the present invention.

In STEP S2230, it is determined whether the second sloped line segment has been found. If the second sloped line segment has not been found, then the detection of sloped line segments ends.

If the second sloped line segment has been found, then the detection goes to STEP S2240. In STEP S2240, the second sloped line segment is set as a new first sloped line segment. After that, the detection goes back to STEP S2220 to carry out a next iteration until a new second sloped line segment cannot be found.

Figure 11:
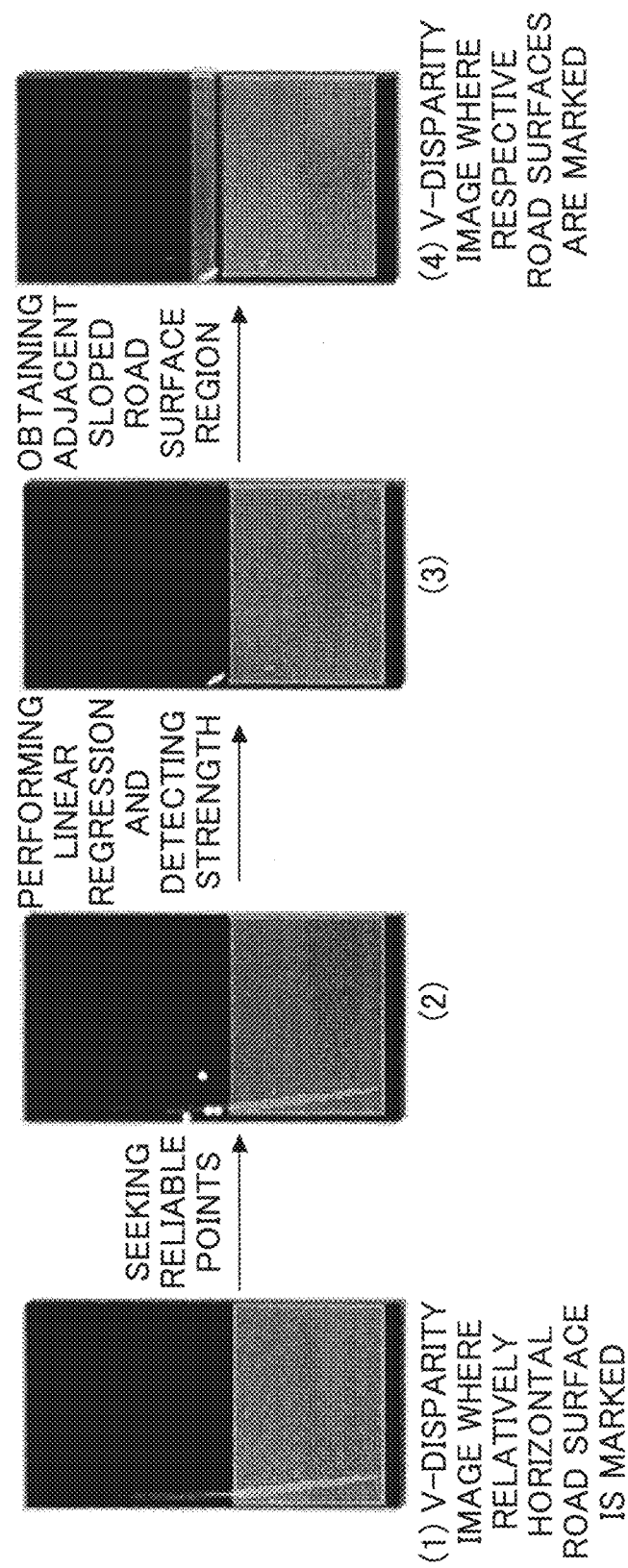
FIG. 11 illustrates an example of, after seeking a relatively horizontal road surface, searching for plural reliable points so as to acquire an adjacent sloped road surface region.

FIG. 11 illustrates an example of, after seeking a relatively horizontal road surface, searching for plural reliable points so as to acquire an adjacent sloped road surface region.

In FIG. 11, image (1) shows a V-disparity image in which a relatively horizontal road surface is marked; image (2) shows that plural reliable points have been found; image (3) shows that a sloped line segment has been obtained according to linear regression; and image (4) shows a V-disparity image in which respective road surface are marked.

<2.4 Obtaining Disparity Map of Road Line Regions of Interest>

After plural sloped line segments in a V-disparity image (corresponding to a first disparity map), representing plural road surfaces are obtained, it is possible to regenerate plural regions in a second disparity map, corresponding to the plural sloped line segments; the regenerated plural regions are called "road line regions of interest". Furthermore it is also possible to obtain the second disparity map of the road line regions of interest.

An approach of obtaining the second disparity map of the road line regions of interest is, for each of the plural sloped line segments in the V-disparity image, creating a new disparity map of the corresponding sloped line segment.

In particular, for each of the plural sloped line segments detected in the V-disparity image, a new disparity map (Img1) is created in which the gray level of each point is initialized to zero. Then, for each point (di, vi) on the corresponding sloped line segment, points, whose disparities are equal to di, on the line vi in the first disparity map are found. If it is assumed that the found points in the first disparity map, corresponding to this point (di, vi) are (u1', vi), (u2', vi), . . . , (un, vi), then in the corresponding new disparity map (Img1), the gray level of each of points corresponding to the found points (u1', vi), (u2', vi), . . . , (un, vi) is set to di. In this way, the corresponding new disparity map (Img1) may be obtained. On the basis of this, the second disparity map of the road line regions of interest may be obtained.

Alternatively, another approach of obtaining the second disparity map of the road line regions of interest is, for each point (di, vi) on each sloped line segment detected in the V-disparity image, seeking a corresponding line in the first disparity map, then finding points, whose disparities are not equal to di, on the corresponding line, and then setting the disparities of these points to zero.

Figure 12:
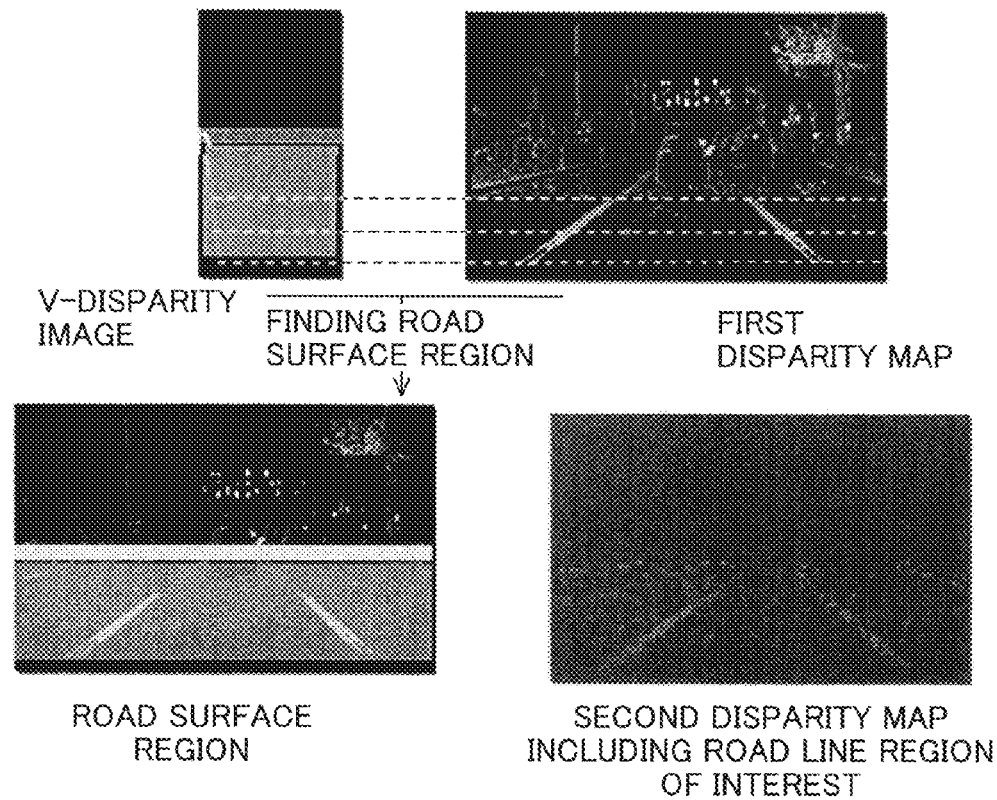
FIG. 12 illustrates an example of regenerating a road line region of interest in a second disparity map on the basis of a sloped line sought in a V-disparity image corresponding to a first disparity map, according to an embodiment of the present invention.

FIG. 12 illustrates an example of regenerating a road line region of interest in a second disparity map on the basis of a sloped line sought in a V-disparity image corresponding to a first disparity map, according to an embodiment of the present invention.

In FIG. 12, the image on the top left shows a V-disparity image; the image on the top right shows a first disparity map corresponding to the V-disparity image; the image on the bottom left shows the first disparity map including a road surface region obtained on the basis of both the V-disparity image and the first disparity map on top right; and the image on the bottom right shows a second disparity map including a road line region of interest serving as a relatively horizontal road surface.

Here it should be noted that it is possible to obtain one second disparity map including plural road line regions of interest, or to obtain plural second disparity maps corresponding to the plural road line regions of interest.

Preferably, if the length of a road line region of interest along the V-axis, in a second disparity map is greater than a predetermined threshold, then the road line region of interest may be divided along its height direction so as to obtain plural new road line regions of interest. The reason of doing this way is because as for an actual road, although its surface is flat, it may have bends, for example, it may be bend to the left, and then bend to the right. In this kind of case, the bending road is still expressed by a sloped line segment in a V-disparity image, but the length of the sloped line segment is relatively longer. In addition, since the road has bends, its road line (at least one) is also bending; as a result, in a disparity map, this kind of road line is not a straight line, but is a bending line.

In other words, by dividing the road line region of interest along its height direction so as to obtain plural new road line regions of interest, in a case in which a step length for the division is suitable, at least one road line in each of the plural new road line regions of interest may be a straight line. After that, it is possible to detect the road lines in the respective new road line regions of interest so as to obtain a bending road line by carrying out fitting with regard to the detected road lines. Moreover, regarding the step length, it may be set on the basis of a rule of thumb, or may be acquired by carrying out training with regard to plural samples.

<2.5 Detection of Road Lines in Road Line Regions of Interest>

In an obtained disparity map of plural road line regions of interest, the Hough transform is utilized to detect lines.

Preferably, since images (for example, left and right images) are captured by a camera (for example, a twin-lens camera) disposed in the forepart of a vehicle, and the vehicle is on a road surface, the slopes of road lines in a disparity map should be within a predetermined range. As a result, it is possible to carry out a filtering process with regard to the road lines on the basis of their slopes; for example, if the slope of a detected road line is not within the predetermined range, then the detected road line is discarded.

Figure 13:
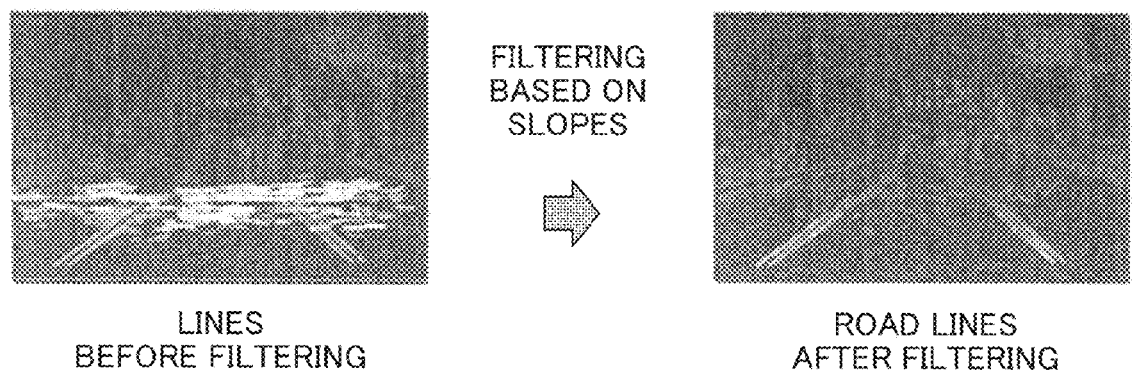
FIG. 13 illustrates a comparison before and after performing a filtering process with regard to road lines on the basis of their slopes.

FIG. 13 illustrates a comparison before and after performing a filtering process with regard to road lines on the basis of their slopes.

In FIG. 13, the left image shows a disparity map of a road line region of interest, in which there are some lines detected by utilizing the Hough transform; the right image shows a result after the filtering process. Therefore, it is apparent that by performing the filtering process with regard to the road lines on the basis of their slopes, it is possible to remove noise so as to be able to obtain a more accurate road line detection result.

3. SECOND EMBODIMENT

Road Line Detection Method

Figure 14:
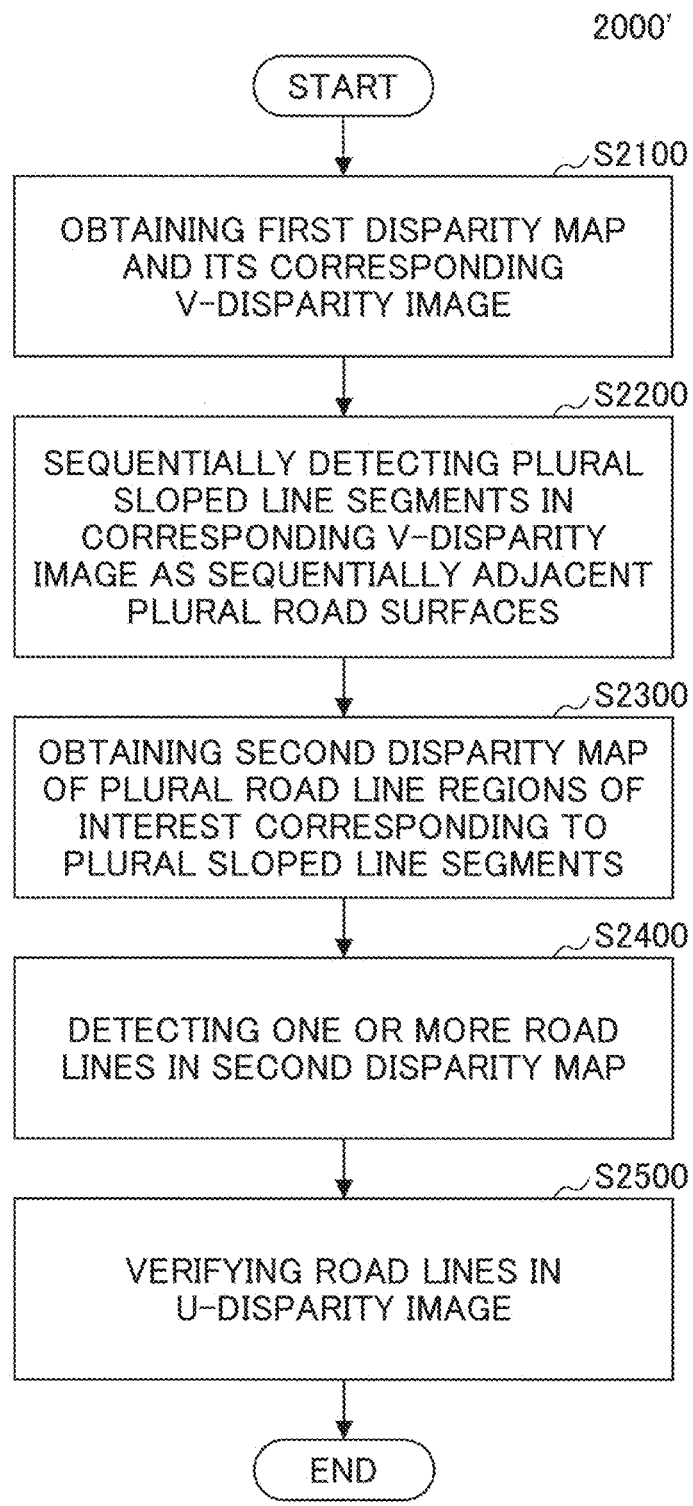
FIG. 14 is a flowchart of a road line detection method according to a second embodiment of the present invention.

FIG. 14 is a flowchart of a road line detection method according to a second embodiment of the present invention.

The difference between the road line detection process 2000' shown in FIG. 14 in this embodiment and the road line detection process 2000 shown in FIG. 2 in the first embodiment is such that in the road line detection process 2000', there is an additional step S2500, i.e., one or more road lines are verified in a U-disparity image. Furthermore, as for the other steps shown in FIG. 14, since they are the same with the corresponding steps shown in FIG. 2, the illustrations of them are omitted here.

According to the nature of a U-disparity image, it is obvious that a road line is expressed as a sloped line segment in the U-disparity image (for details, see "A Complete U-V-Disparity Study for Stereovision Based 3D Driving Environment Analysis"; Zhencheng Hu, F. Lamosa, and K. Uchimura; Fifth International Conference on 3-D Digital Imaging and Modeling, 2005, pp. 240-211). As a result, on the basis of this feature, it is possible to carry out verification and filtering with regard to the road lines detected in STEP S2400 of FIG. 14.

For that purpose, first the road lines detected in STEP S2400 of FIG. 14 (here, also called "detected lines") are projected onto a U-disparity image. This may be achieved by utilizing the approach, of calculating the U-disparity image from the disparity map, described above by referring to FIG. 7.

In particular, gray levels of all of the points in a U-disparity image corresponding to a disparity map (for example, a second disparity map obtained in STEP S2400 of FIG. 14) are initialized to zero, and then for each point (ui, uv) on a detected line in the disparity map, if it is assumed that the gray level/disparity value of this point (ui, uv) is di, then the gray level of a point in the U-disparity image, corresponding to the point (ui, uv) is set to a non-zero value, for example, 255. In this way, it is possible to obtain a point set in the U-disparity image, corresponding to the detected line in the disparity map.

After that, if the elements of the point set are located on a sloped line, for example, a sloped line expressed by $d=au+b$, then it is verified that the detected line is a road line; otherwise, the detected line is discarded.

Figure 15:
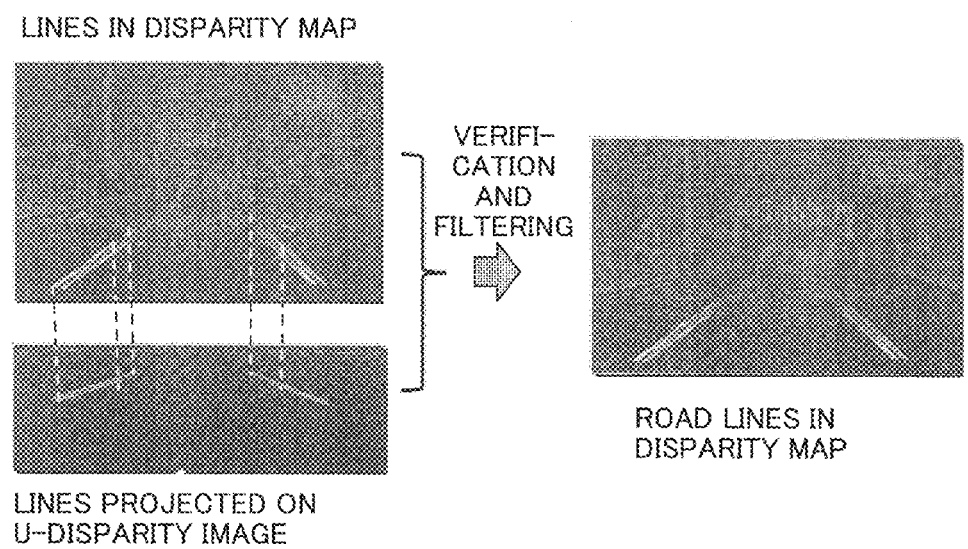
FIG. 15 illustrates examples of lines detected in a disparity map and their corresponding lines projected onto a U-disparity image as well as results of conducting verification and filtering with regard to the lines detected in the disparity map.

FIG. 15 illustrates examples of lines detected in a disparity map and their corresponding lines projected onto a U-disparity image as well as results of conducting verification and filtering with regard to the lines detected in the disparity map.

In FIG. 15, the top left image shows the lines detected in the disparity map; the bottom left image shows the corresponding lines projected onto the U-disparity image; and the right image shows road lines in the disparity map after verification and filtering.

As a result, by employing the feature that a road line in a U-disparity image should be a sloped line, to further carry out filtering and verification with regard to the detected lines, it is possible to further improve the detection accuracy.

4. THIRD EMBODIMENT

Road Line Detection Method

Figure 16:
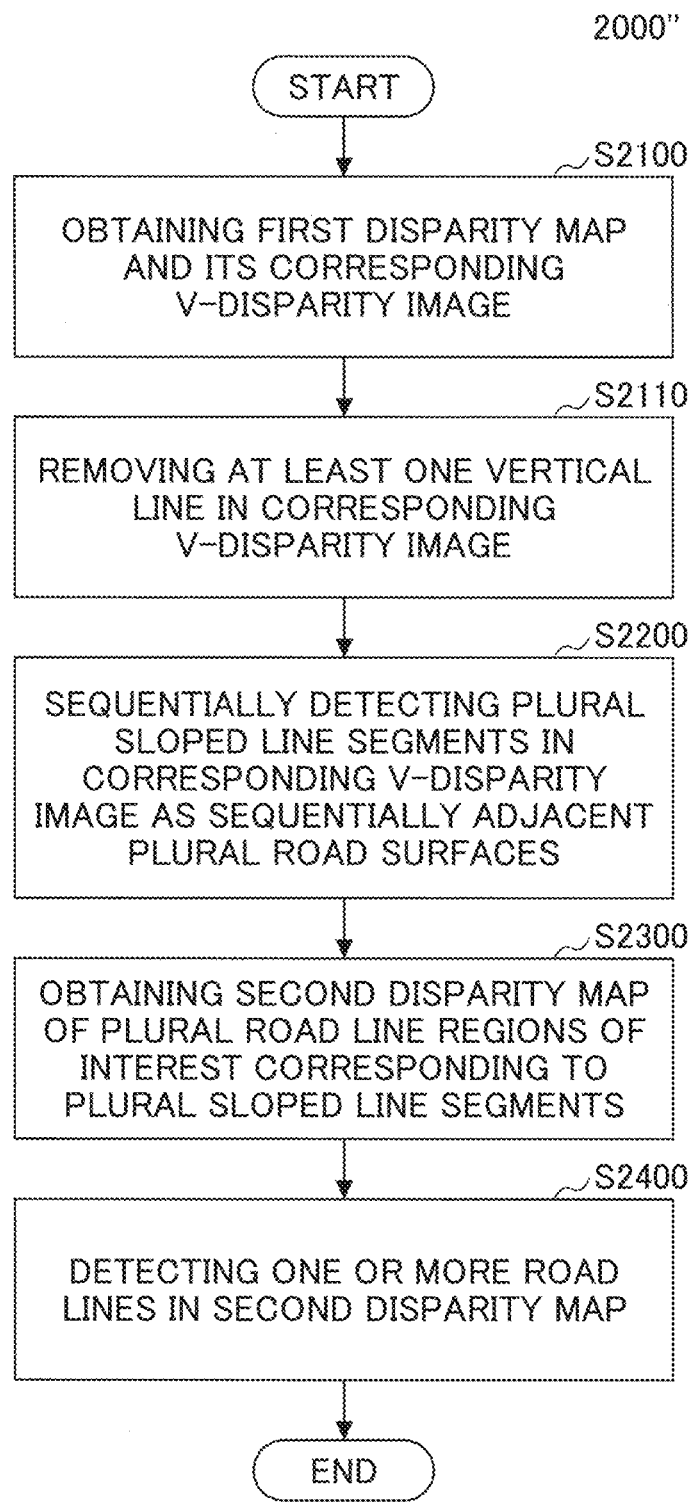
FIG. 16 is a flowchart of a road line detection method according to a third embodiment of the present invention.

FIG. 16 is a flowchart of a road line detection method according to a third embodiment of the present invention.

The difference between the road line detection process 2000" in this embodiment and the road line detection process 2000 in the first embodiment is such that, in the road line detection process 2000" shown in FIG. 16, there is an additional STEP S2110, i.e., a step of, before detecting plural sloped line segments in a V-disparity image, removing at least one vertical line, whose length is greater than a predetermined threshold value, in the V-disparity image. As for the other steps shown in FIG. 16, since they are the same with the corresponding steps shown in FIG. 2, the illustrations of them are omitted here.

As described above, the V-disparity image may be regarded as a lateral view of a disparity map (for example, a first disparity map obtained in STEP S2100 shown in FIG. 16); as a result, for example, a vehicle, a person, or an obstacle standing in the disparity map is expressed as a vertical line in the V-disparity image. Having regard to this, it is possible to detect at least one vertical line serving as noise in the V-disparity image, and then to remove the vertical line; in this way, it is possible to more rapidly and accurately detect one or more road lines in the follow-on process.

Figure 17:
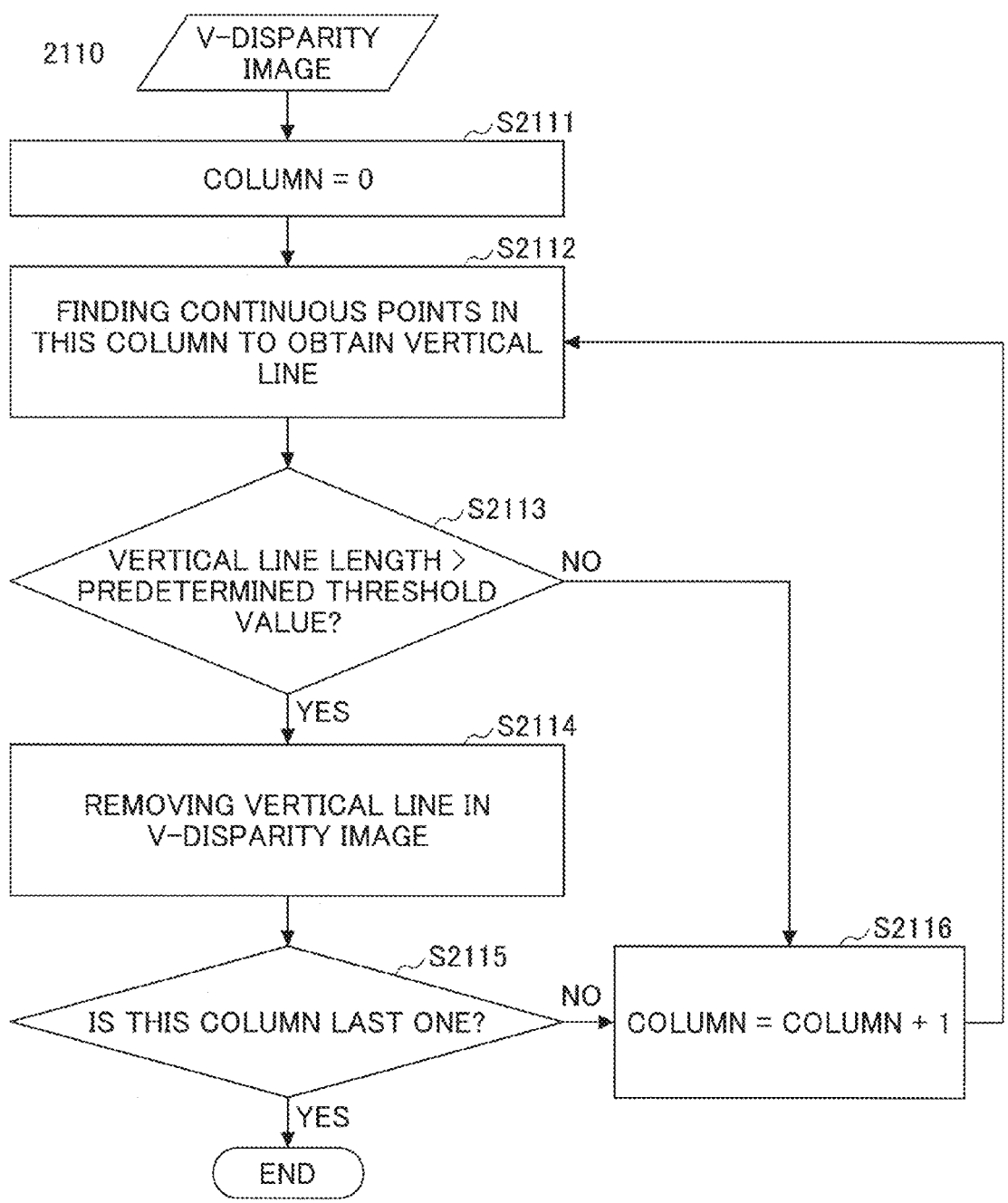
FIG. 17 is a flowchart of detecting and removing at least one vertical line in a V-disparity image, according to an embodiment of the present invention.

FIG. 17 is a flowchart of a process of detecting and removing at least one vertical line in a V-disparity image, according to an embodiment of the present invention.

As shown in FIG. 17, first a V-disparity image is input. Then, in STEP S2111, it is set that COLUMN=0; that is, the process starts from the first column.

In STEP S2112, continuous points on this column are found so as to obtain a vertical line.

In STEP S2113, it is determined whether the length of the vertical line is greater than a predetermined threshold value. If the result is YES, then the process goes to STEP S2114; otherwise the process goes to STEP S2116.

In STEP S2114, the vertical line is removed, and then the process goes to STEP S2115.

In STEP S2115, it is determined whether this column is a last one. If the result is YES, then the process ends; otherwise the process goes to STEP S2116.

In STEP S2116, it is set that COLUMN=COLUMN+1, and then the process goes back to STEP S2112 to repeatedly carry out the above operations.

Figure 18:
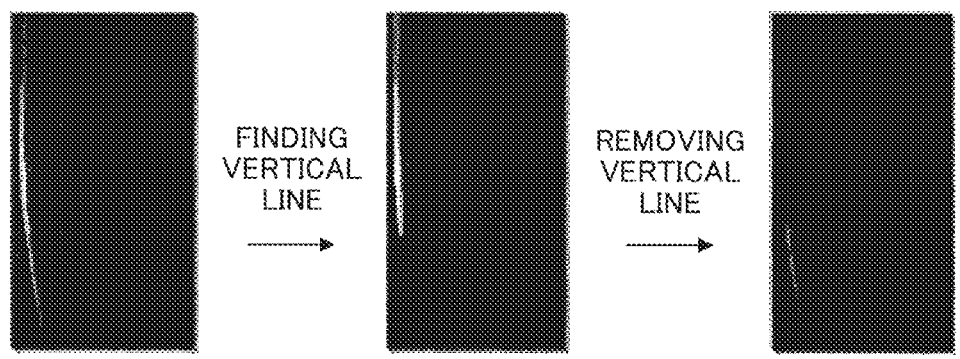
FIG. 18 illustrates an example of seeking and removing a vertical line in a V-disparity image.

FIG. 18 illustrates an example of seeking and removing a vertical line in a V-disparity image.

In FIG. 18, the left image shows an original disparity map; the middle image shows that a vertical line has been found; and the right image shows the result of removing the found vertical line.

5. ROAD LINE DETECTION DEVICE

Figure 19:
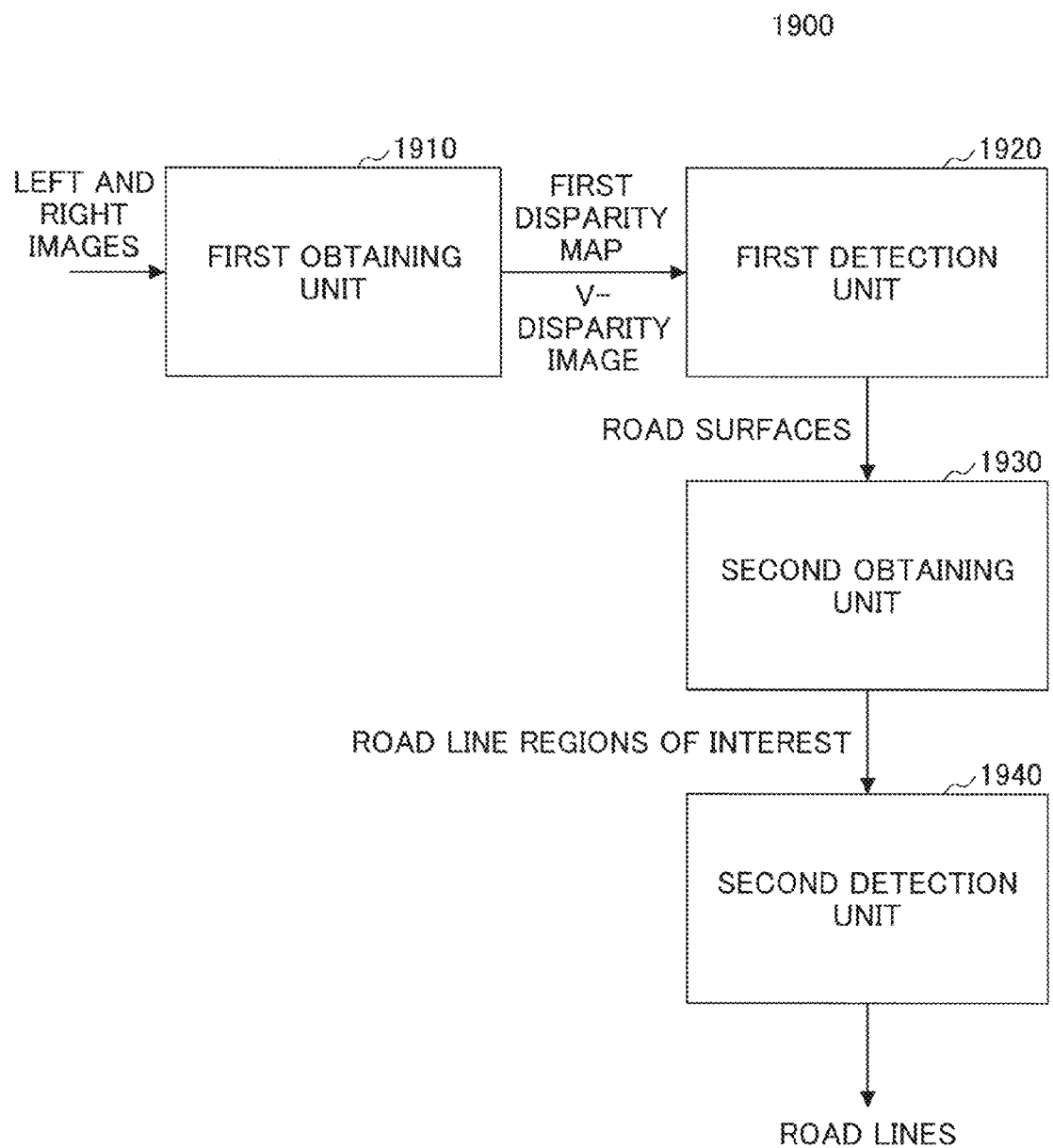
FIG. 19 illustrates a block diagram of a road line detection device according to an embodiment of the present invention.

FIG. 19 illustrates a block diagram of a road line detection device 1900 according to an embodiment of the present invention.

As shown in FIG. 19, the road line detection device 1900 may include a first obtaining unit 1910, a first detection unit 1920, a second obtaining unit 1930, and a second detection unit 1940.

The first obtaining unit 1910 is configured to obtain a first disparity map including one or more road regions and a corresponding V-disparity image.

The first detection unit 1920 is configured to sequentially detect plural sloped line segments in the corresponding V-disparity image according to a big-to-small order of disparities and a big-to-small order of V-values, to serve as sequentially adjacent plural road surfaces.

The second obtaining unit 1930 is configured to obtain a second disparity map of plural road line regions of interest corresponding to the plural sloped line segments.

The second detection unit 1940 is configured to detect one or more road lines in the second disparity map of the plural road line regions of interest.

Here it should be noted that since the operations of the respective units in the road line detection device 1900 may be reached by referring to the above illustrations carried out on the basis of FIG. 2, they are omitted here.

6. ROAD REGION DETECTION METHOD

Figure 20:
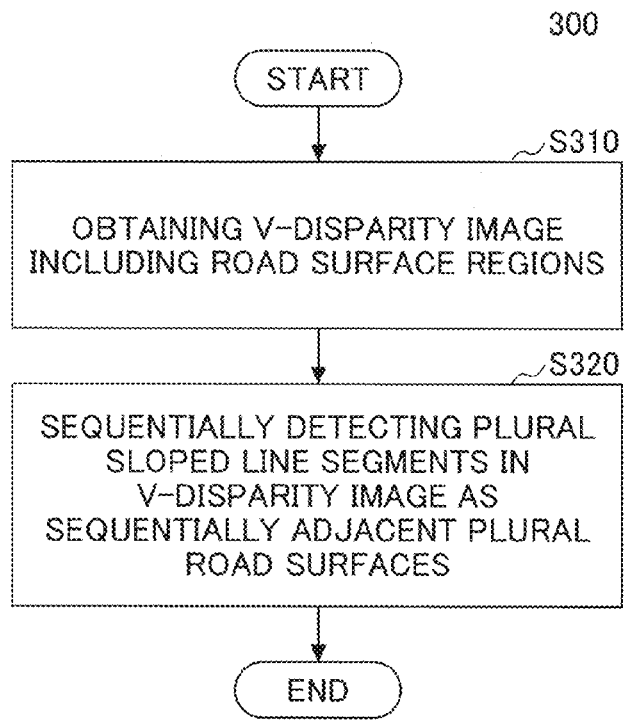
FIG. 20 is a flowchart of a road region detection method according to an embodiment of the present invention.

FIG. 20 is a flowchart of a road region detection method according to an embodiment of the present invention.

As shown in FIG. 20, in STEP S310 of the road region detection process 300, a V-disparity image including one or more road regions is obtained. The operation of this step is similar to that of STEP S2100 shown in FIG. 2; the difference between the two is such that in this step, it is not necessary to obtain a disparity map.

Here it is also possible to obtain a disparity map by performing calculation with regard to left and right images captured by a twin-lens camera, and then to obtain the V-disparity image on the basis of the obtained disparity map. Alternatively, it is also possible to directly obtain the V-disparity image by carrying out calculation with regard to the left and right images. Alternatively, it is also possible to acquire a depth map by conducting calculation with regard to a stereoscopic image captured by a stereoscopic camera, then to obtain a disparity by performing calculation with regard to the depth map, and then to acquire the V-disparity image by carrying out calculation with regard to the disparity map. In addition, alternatively, it is also possible to obtain a depth map by conducting calculation with regard to a stereoscopic image captured by a stereoscopic camera, and then to directly acquire the V-disparity image by performing calculation with regard to the depth map.

In STEP S320, plural sloped line segments in the V-disparity image are sequentially detected according to a big-to-small order of disparities and a big-to-small order of V-values, to serve as sequentially adjacent plural road surfaces. Since the operation of this step is the same with that of STEP S2200 shown in FIG. 2, its description is omitted here.

After the road surfaces are obtained from the V-disparity image, they may be utilized for carrying out another process. For example, in FIG. 2, the road surfaces may be utilized to obtain the second disparity map for detecting the road lines. However, the present invention is not limited to this; for example, in a corresponding U-disparity image, the road surfaces may also be utilized to directly detect one or more road lines therein. In addition, the other process is not limited to the road line detection; for example, the other process may be vehicle detection, fence detection, or road shoulder detection.

As a result, by employing the road region detection method, it is possible to accurately detect an uneven road surface.

7. ROAD REGION DETECTION DEVICE

Figure 21:
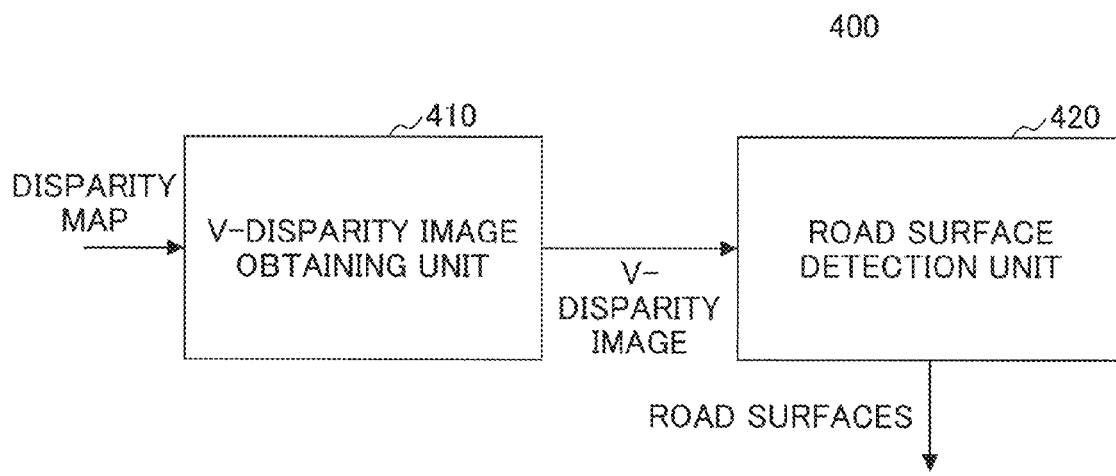
FIG. 21 illustrates a block diagram of a road region detection device according to an embodiment of the present invention.

FIG. 21 illustrates a block diagram of a road region detection device according to an embodiment of the present invention.

As shown in FIG. 21, the road region detection device 400 may include a V-disparity image obtaining unit 410 and a road surface detection unit 420.

The V-disparity image obtaining unit 410 is configured to obtain a V-disparity image including one or more road regions. The road surface detection unit 420 is configured to sequentially detect plural sloped line segments in the V-disparity image according to a big-to-small order of disparities and a big-to-small order of V-values, to serve as sequentially adjacent plural road surfaces.

The road surfaces obtained by the road region detection device 400 may serve as a basis for carrying out a further operation. For example, in FIG. 2, the road surfaces are utilized to obtain the second disparity map for detecting the road lines. However, the present invention is not limited to this; for example, in a corresponding U-disparity image, the road surfaces may also be utilized to directly detect one or more road lines therein. In addition, the further operation is not limited to the road line detection; for example, the further operation may be vehicle detection, fence detection, road shoulder detection, or even passer-by detection.

As a result, by employing the road region detection device, it is possible to accurately detect an uneven road surface.

8. HARDWARE ARRANGEMENT OF SYSTEM

The present invention may be also achieved by a system for detecting one or more road regions and/or road lines.

Figure 22:
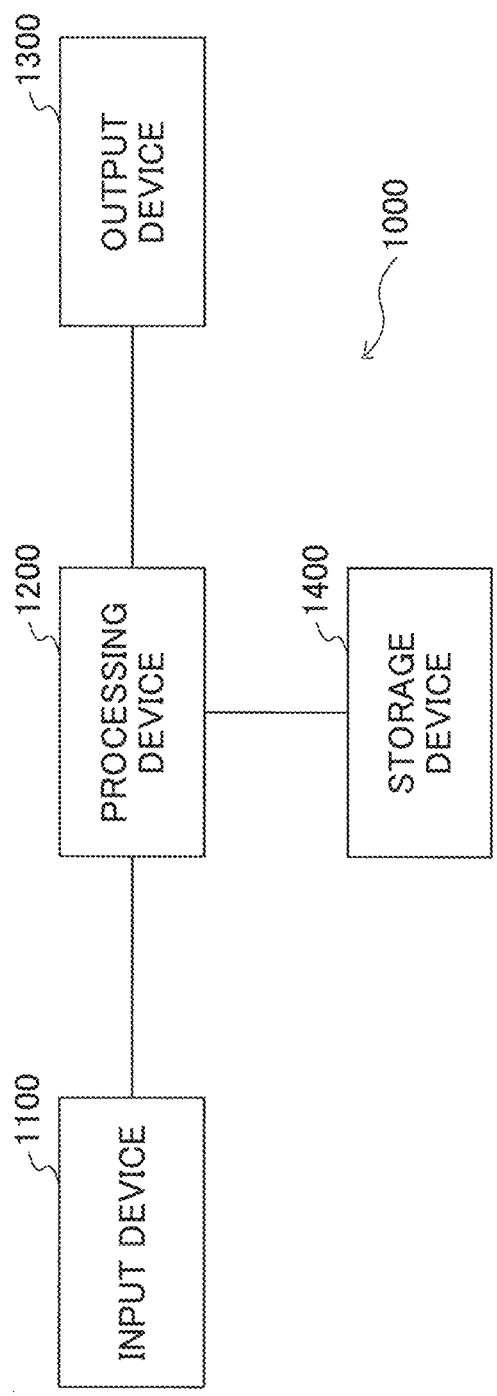
FIG. 22 illustrates a hardware arrangement block diagram of a system 1000 for detecting one or more road regions and/or road lines, according to an embodiment of the present invention.

FIG. 22 illustrates a hardware arrangement block diagram of a system 1000 for detecting one or more road regions and/or road lines, according to an embodiment of the present invention.

As shown in FIG. 22, the system 100 may include an input device 1100, a processing device 1200, an output device 1300, and a storage device 1400.

The input device 1100 is configured to be used for inputting one or more images waiting for processing from an external device, for example, left and right images captured by a twin-lens camera, or a stereoscopic video captured by a stereoscopic camera. The input device 1100 may include a keyboard, a mouse, a communication network having a remote input device connected to the communication network, etc.

The processing unit 1200 is configured to be used for carrying out the method of detecting one or more road regions and/or road lines according to the embodiments of the present invention, or to serve as the device for detecting one or more road regions and/or road lines according to the embodiments of the present invention. The processing unit 1200 may include a central processing unit (CPU) of a computer, a processor having a processing ability, etc. The processing unit 1200 may be connected to a network (not shown in FIG. 22) such as the Internet, and may obtain data, for example, the left and right images, from the network according to actual needs.

The output device 1300 is configured to be used for outputting the result obtained after performing the method of detecting one or more road regions and/or road lines to an external device. The external device may include, for example, a display unit, a printer, a communication network having a remote output device connected to the communication network, etc.

The storage device 1400 is configured to be used for storing, in a volatile or non-volatile manner, data, for example, the left and right images or the obtained results, when conducting the method of detecting one or more road regions and/or road lines. The storage device 1400 may include, for example, various volatile or non-volatile memories such as a random-access memory (RAM), a read-only memory (ROM), a hard disk, a semiconductor memory, etc.

9. CONCLUSIONS

In the above descriptions, the method and the device for detecting one or more road lines are disclosed which comprise a process of obtaining the first disparity map including one or more road regions and the corresponding V-disparity image; a process of sequentially detecting the plural sloped line segments in the V-disparity image according to the big-to-small order of disparities and the big-to-small order of V-values, to serve as the sequentially adjacent plural road surfaces; a process of obtaining the second disparity map of plural road line regions of interest corresponding to the plural sloped line segments; and a process of detecting one or more road lines in the second disparity map of the plural road line regions of interest.

The method and device for detecting one or more road lines utilize the V-disparity image to sequentially detect the plural sloped line segments according to the big-to-small order of disparities and the big-to-small order of V-values, and let the detected plural sloped line segments serve as the plural road surfaces. As a result, it is possible to more rapidly and accurately identify an uneven road surface.

Furthermore, in one of the above embodiments of the present invention, it is possible to use the U-disparity image to verify the results of the road line detection. As a result, it is possible to further improve the detection accuracy.

Moreover, in one of the above embodiments of the present invention, it is possible to detect and remove at least one vertical line in the V-disparity image so as to clear at least one obstacle. As a result, it is possible to further improve the detection speed and accuracy.

On the other hand, in the above descriptions, the method and the device for detecting one or more road regions are disclosed which comprise a process of obtaining the disparity map including one or more road regions and the corresponding V-disparity image; and a process of sequentially detecting the plural sloped line segments in the V-disparity image according to the big-to-small order of disparities and the big-to-small order of V-values, to serve as the sequentially adjacent plural road surfaces.

The method and the device for detecting one or more road surface regions may rapidly and accurately detect an uneven road surface.

In addition, in the above descriptions, the V-disparity image and/or U-disparity image may be acquired by carrying out calculation with regard to the obtained disparity map. However, it is apparent that the V-disparity image and/or U-disparity image may be directly acquired by performing calculation with regard to left and right images captured by a special camera such as a twin-lens camera1, a multi-lens camera, a stereoscopic camera, etc., or may be directly acquired by conducting calculation with regard to a depth map in stereoscopic vision.

In the above embodiments, after the plural road surfaces are detected in the V-disparity image, one or more road lines are detected in the second disparity map. However, it is obvious that it is also possible to directly detect the road lines in the corresponding U-disparity image, or to detect the road liens in both the second disparity map and the U-disparity image, and then combine the detection results of the two so as to obtain a final detection result. Also it is possible to utilize this kind of road surface information to detect at least one road line in an ordinary image (i.e., a non-disparity map) by employing the conventional image recognition approaches.

Furthermore, in the above embodiments, the target of the detection is a road line; however the present invention is not limited to this. In other words, it is possible to detect a road dividing object such as a road shoulder or a fence, and even to detect a vehicle or a passer-by on a road surface.

Moreover, in the above embodiments, the Hough transform is utilized to detect lines; however, the present invention is not limited to this. In other words, any other proper conventional approaches of detecting lines on the basis of points, for example, a linear fitting approach, may be applied to the present invention.

Additionally, in the above embodiments, the case is illustrated in which a vehicle goes ahead and a twin-lens camera captures a scene before the vehicle. However, the present invention is also applied to a case in which a vehicle goes in reverse and a twin-lens camera captures a scene behind the vehicle. In this case, what is detected is the road surface behind the vehicle.

Up to here, the basis principle of the present invention has been illustrated by referring to the embodiments. However, it should be noted that those people skilled in the art may understand that all or parts of the steps or the units of the method or the device according to the embodiments of the present inventions may be achieved in any suitable computing device (including processors and storage media, etc.) or in any proper network of computing devices in a manner of software, firmware, software, or a combination of them. This may be fulfilled by those people skilled in the art on the grounds of their basic programming skills after reading this specification.

As a result, the aims of the present invention may be realized by executing one or more programs in a computing device. The computing device may be a common device, for example, a common computer. In addition, the aims of the present invention may also be realized only by providing a program product including program codes able to achieve the methods and the devices according the embodiments of the present invention. In other words, this kind of program product may make up the present invention, and a storage medium storing this kind of program product may also make up the present invention. Additionally, it is apparent that the storage medium may be any conventional one or any one developed in the future.

It should also be noted that in the methods and devices according to the embodiments of the present invention, the respective steps or units may be disassembled or recombined. The disassembled or recombined ones should be regarded as equivalent to the present invention. In addition, the above processes may be carried out according to an order of time as described above; however, the present invention is not limited to this. In other words, some processes may be conducted independently or in parallel. For example, in one of the above embodiments of the present invention, the road lines in the road line regions of interest corresponding to the detected sloped line segments are detected after all of the sloped line segments serving as the road surfaces, in the V-disparity image are detected. However, it is also possible to immediately obtain, after one sloped line segment in the V-disparity image is detected, the road line region of interest corresponding to this sloped line segment, and then to detect the road lines in this road line region of interest; after that, the adjacent sloped line segment in the V-disparity image is detected. Alternatively, it is also possible to carry out the following in parallel, namely the detection of the adjacent slope line segments as well as the obtaining of the corresponding road line region of interest and the detection of the road lines therein.

While the method and the device for detecting one or more road lines as well as the method and the device for detecting one or more road regions are described with reference to the specific embodiments chosen for the purpose of illustration, it should be apparent that the present invention is not limited to these embodiments, but numerous modifications could be made thereto by those people skilled in the art without departing from the basic concept and technical scope of the present invention.

The present application is based on Chinese Priority Patent Application No. 201110434873.X filed on Dec. 22, 2011, the entire contents of which are hereby incorporated by reference.

What is claimed is:

1. A road line detection method comprising:
obtaining a first disparity map including one or more road regions and a corresponding V-disparity image, the V-disparity image being a lateral view of the first disparity map;
sequentially detecting plural sequentially adjacent road surfaces by iteratively detecting road surfaces based on corresponding sloped line segments in the V-disparity image from a starting point where disparity and V-value is maximum, each road surface being formed by linear fitting a plurality of reliable points that do not form a vertical line and whose gray levels are greater than a threshold and disparities are less than the reliable points of previously detected road surfaces;
for each of the detected road surfaces, obtaining a second disparity map; and
detecting one or more road lines in the second disparity map.

2. The method according to claim 1, further comprising:
for each of the road lines detected in the second disparity map,
obtaining points in a U-disparity image, corresponding to this road line, the U-disparity image being a top view of the first disparity map;
determining whether the obtained points are located on a non-vertical and non-horizontal sloped line; and
discarding this road line if it is determined that the obtained points are not located on the sloped line.

3. The method according to claim 1, wherein, the detecting a first road surface includes:
finding all of the sloped line segments in the corresponding V-disparity image by utilizing a Hough transform; and
selecting, from all of the sloped lines segments, one sloped line segment on which the number of pass points is maximum or whose disparity is maximum or whose length is maximum, and then letting the selected sloped line segment be the first sloped line.

4. The method according to claim 1, wherein:
the first disparity map is obtained by performing calculation with regard to left and right images of a scene in front of a vehicle; and
the detecting the first road surface includes seeking points satisfying $$\frac{h}{b}\Delta = f\sin\theta + V\cos\theta$$

so as to obtain the first sloped line, wherein, h refers to a height from a twin-lens camera for capturing the left and right images to a road surface, b refers to a distance between the centers of two lenses in the twin-lens camera, θ refers to an angle between an image surface and the road surface, f refers to a focal length of the twin-lens camera, Δ refers to a disparity of a point on a sloped line segment, and V refers to a V-value of the point on the sloped line segment.

5. The method according to claim 1, further comprising:
before detecting the plural sloped line segments, removing at least one vertical line, whose length is greater than a predetermined threshold value, in the corresponding V-disparity image.

6. The method according to claim 1, further comprising:
if a V-axis length of any one of the plural road line regions of interest in a second disparity map is greater than a predetermined threshold, then dividing this road line region of interest along its height direction so as to obtain plural new road line regions of interest.

7. The method according to claim 1, further comprising:
if a slope of any one of the detected road lines is not within a predetermined range, then discarding this road line.

8. A road region detection method comprising:
obtaining a V-disparity image including one or more road regions, the V-disparity image being a lateral view obtained from a first disparity map; and
sequentially detecting plural sequentially adjacent road by iteratively detecting road surfaces based on corresponding sloped line segments in the V-disparity image from a starting point where disparity and V-value is maximum, each road surface being formed by linear fitting a plurality of reliable points that do not form a vertical line and whose gray levels are greater than a threshold and disparities are less than the reliable points of previously detected road surfaces.

9. A road line detection device comprising:
a processor configured to execute program instructions, the program instructions configuring the processor to, obtain a first disparity map including one or more road regions and a corresponding V-disparity image, the V-disparity image being a lateral view of the first disparity map;

sequentially detect plural sequentially adjacent road surfaces by iteratively detecting road surfaces based on corresponding sloped line segments in the V-disparity image from a starting point where disparity and V-value is maximum, each road surface being formed by linear fitting a plurality of reliable points that do not form a vertical line and whose gray levels are greater than a threshold and disparities are less than the reliable points of previously detected road surfaces;

obtain a second disparity map; and detect one or more road lines in the second disparity map.

10. The method according to claim 1, wherein the gray level of each of the plurality of reliable points forming the corresponding sloped line segment associated with a detected road surface in the second disparity map is set to a same level.

11. The device according to claim 9, wherein the gray level of each of the plurality of reliable points forming the corresponding sloped line segment associated with a detected road surface in the second disparity map is set to a same level.

* * * * *